(12) United States Patent
Ichikawa et al.

(10) Patent No.: US 7,336,378 B2
(45) Date of Patent: Feb. 26, 2008

(54) IMAGE PROCESSING WITH RECOGNIZED CHARACTER CODES

(75) Inventors: Yukihiko Ichikawa, Chiba (JP); Naoya Misawa, Kawasaki (JP); Yoshinori Tanaka, Tokyo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 784 days.

(21) Appl. No.: 09/919,814

(22) Filed: Aug. 2, 2001

(65) Prior Publication Data

US 2002/0048032 A1    Apr. 25, 2002

(30) Foreign Application Priority Data

Aug. 7, 2000   (JP)   ............................. 2000-238477
Sep. 5, 2000   (JP)   ............................. 2000-268830

(51) Int. Cl.
  *G06F 15/00*   (2006.01)
(52) U.S. Cl. .................. 358/1.11; 358/1.18; 382/177; 382/298; 382/301
(58) Field of Classification Search ............... 358/1.11, 358/1.18; 382/177, 298, 301
See application file for complete search history.

(56) References Cited

U.S. PATENT DOCUMENTS

| | | | | |
|---|---|---|---|---|
| 5,533,174 A | * | 7/1996 | Flowers et al. | 358/1.15 |
| 5,812,743 A | * | 9/1998 | Takahashi | 358/1.11 |
| 5,825,942 A | * | 10/1998 | Miyaza | 382/298 |
| 5,892,844 A | * | 4/1999 | Fujisawa | 382/177 |
| 6,011,879 A | * | 1/2000 | Nemoto et al. | 382/301 |
| 6,243,549 B1 | * | 6/2001 | Ando | 399/85 |

(Continued)

FOREIGN PATENT DOCUMENTS

JP   05-108793   4/1993

(Continued)

OTHER PUBLICATIONS

IBM Technical Disclosure Bulletin, Image Adjustment Using Optical Character Recognition, Jun. 1, 1994, vol. 37, Issue 6B, pp. 535-536.*

*Primary Examiner*—Twyler Lamb
*Assistant Examiner*—Mark R. Milia
(74) *Attorney, Agent, or Firm*—Buchanan Ingersoll & Rooney PC

(57) ABSTRACT

In an image processor for a character image included in an image data to be processed, character codes are recognized, and character sizes of the characters in the character image are recognized. A font data is selected in a plurality of font data of different sizes stored in a storage device, so as to match with the recognized character codes, the recognized font sizes and a magnification of the image data. The selected font data are outputted. Thus, the character image is reproduced by using the recognized character codes. Alternatively, in a saving mode where image data of N pages are outputted in M sheets of recording medium, wherein N is not equal to M, character codes are recognized in a character image included in N pages of image data to be processed. Then, a font data is selected in a plurality of font data, so as to match with the recognized character codes. Then, an output image data in a layout of M sheets is generated by using the selected font data, and the generated output image data is outputted.

21 Claims, 23 Drawing Sheets

U.S. PATENT DOCUMENTS

| | | | |
|---|---|---|---|
| 6,337,924 B1 * | 1/2002 | Smith | 382/190 |
| 6,452,597 B1 * | 9/2002 | Goldberg et al. | 345/472 |
| 6,484,149 B1 * | 11/2002 | Jammes et al. | 705/26 |
| 2004/0114804 A1 * | 6/2004 | Tanioka | 382/187 |

FOREIGN PATENT DOCUMENTS

JP          10-322542          12/1998

\* cited by examiner

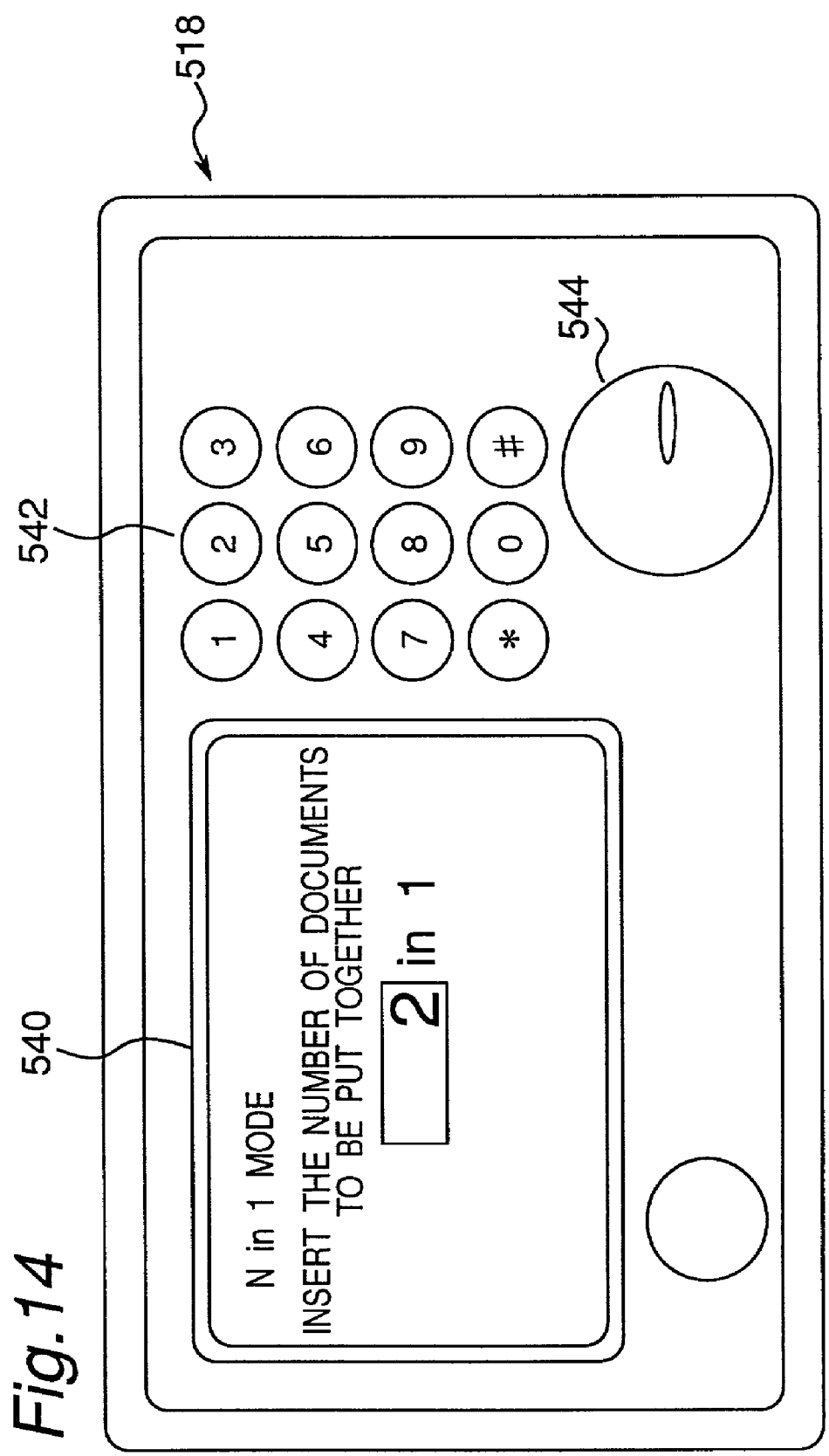

Fig. 15A
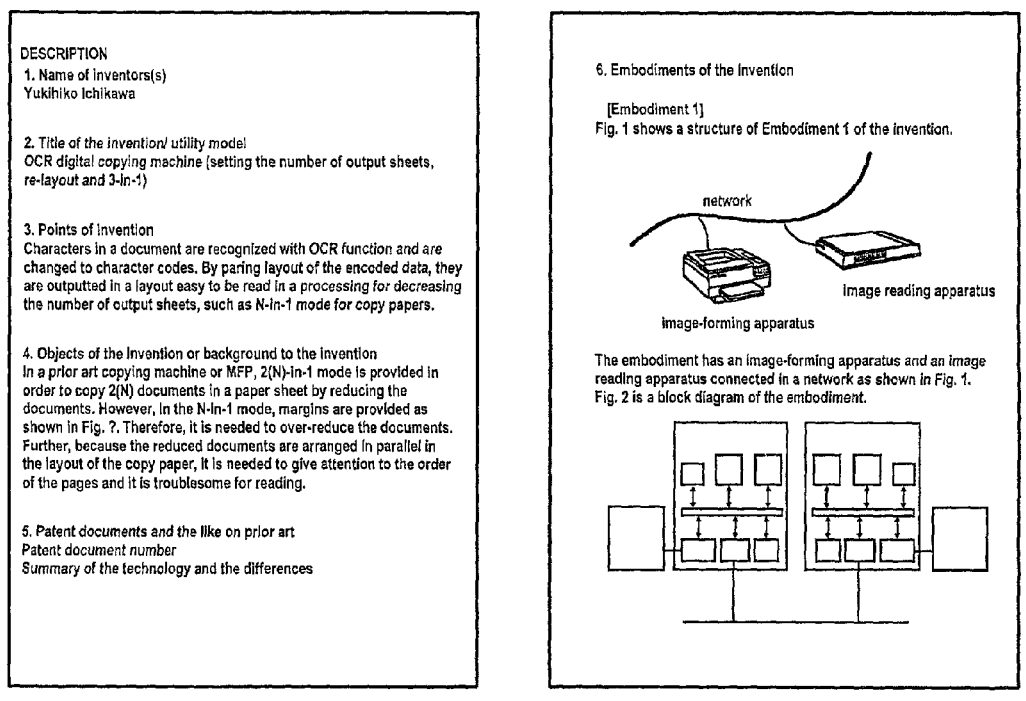
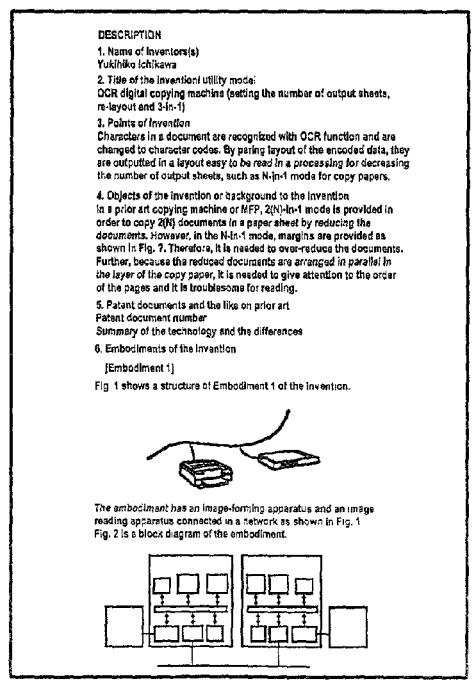

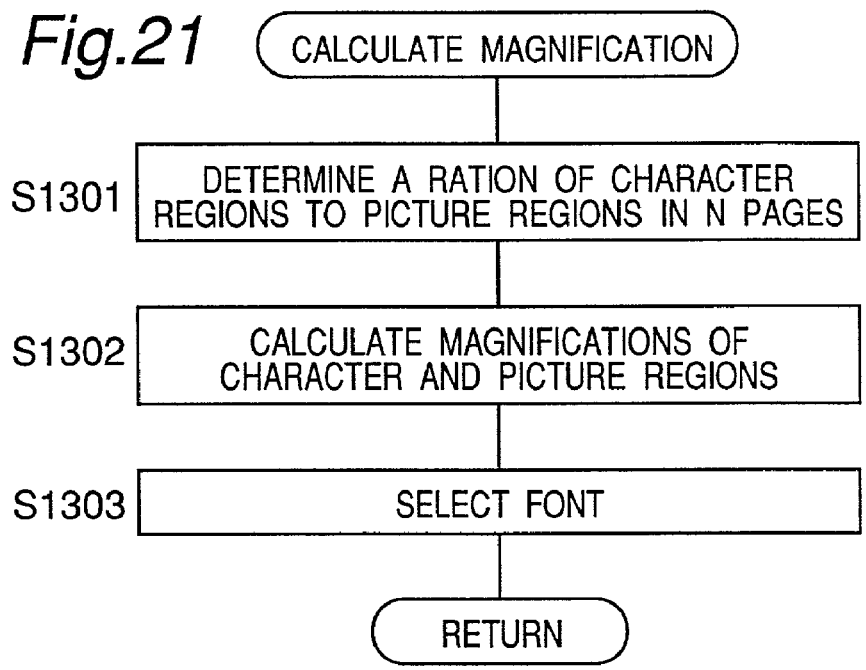
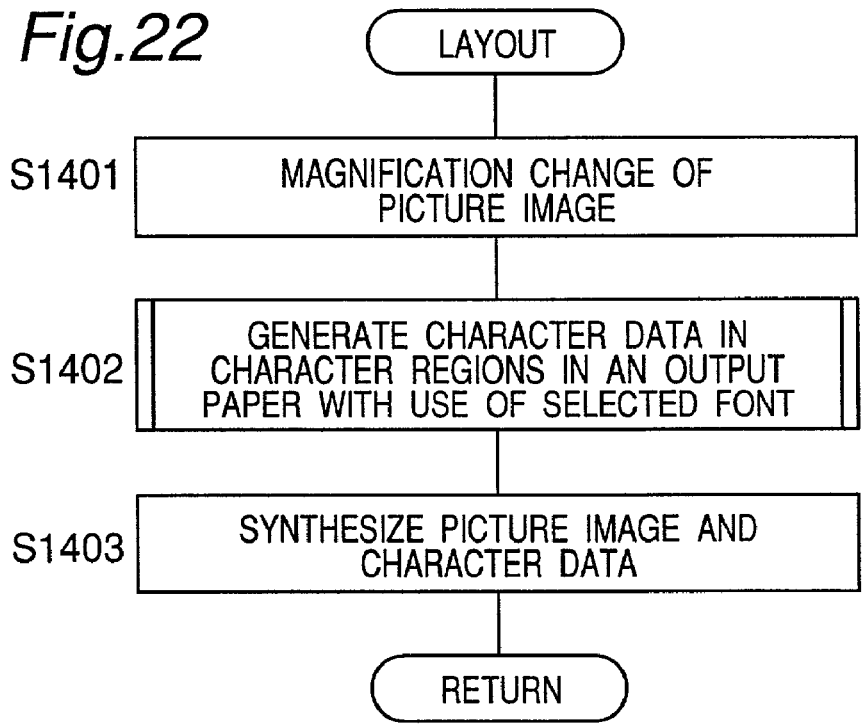

IMAGE PROCESSING WITH RECOGNIZED CHARACTER CODES

This application is based on application Nos. 2000-238477 and 2000-268830 filed in Japan, the contents of which are hereby incorporated by reference.

BACKGROUND OF THE INVENTION

1. Field of the Invention

The present invention relates to image data processing using optical character recognition for recognizing a character image in a document.

2. Description of Prior Art

In a digital copying machine or the like, digital image data may be subjected to various data processing. For example, when an image data obtained by reading a document is enlarged, the image data is subjected to interpolation in correspondence to the magnification. When the image is reduced, the image data are thinned in correspondence to the magnification.

However, in a copy obtained by the above-mentioned enlargement where the image data is interpolated simply, the outline of a character image may become disordered (or the outline may become jaggy), and in a copy obtained by the above-mentioned reduction where the image data is thinned simply, characters may be deformed. When a copy are read, characters in the copy are liable to be read with a strange feeling or not to be read due to such deterioration of image quality of enlarged or reduced characters.

On the other hand, in a prior art copying machine or the like, there is a saving mode wherein the number of copies of documents is decreased relative to the number of the documents. A saving mode includes reduction of digital image data obtained by reading documents. For example, in N-in-1 mode, as one of the saving modes, images of N documents are reduced and arranged in a layout, wherein N denotes a natural number, and the images in the layout are formed in a sheet of paper.

However, in prior art N-in-1 mode, an entire original document including a margin thereof is subjected to the reduction. For example, when two documents are reduced to a sheet of paper, the margin of the two documents is reproduced at the periphery of a sheet of paper (refer to an example in 2-in-1 mode shown in FIG. 15B). Then, the documents are reduced more than necessity, and this makes characters in the document smaller. Further, an output copy of portrait documents may be changed to a landscape output image. In such a case, portrait and landscape copies are mixed, and this is inconvenient for filing. Further, because a plurality of documents are reduced simply in a layout in a sheet of paper, when a copy is read, it is necessary to read the output images while confirming the order of the pages of the documents.

SUMMARY OF THE INVENTION

An object of the present invention is to provide a character image of good quality when magnification of an image is changed.

Another object of the present invention is to output an image efficiently in readable layout.

In one aspect of the invention, in a character image included in an image data to be processed, character codes are recognized, and character sizes of the characters in the character image are recognized. A font data is selected in a plurality of font data of different sizes stored in a storage device, so as to match with the recognized character codes, the recognized font sizes and a magnification of the image data. The selected font data are outputted. Thus, the character image is reproduced by using the recognized character codes.

In another aspect of the invention, in a saving mode where image data of N pages are outputted in M sheets of recording medium, wherein N and M are natural numbers and N is not equal to M, character codes are recognized in a character image included in N pages of image data to be processed. Then, a font data is selected in a plurality of font data, so as to match with the recognized character codes. Then, an output image data in a layout of M sheets is generated by using the selected font data, and the generated output image data is outputted.

An advantage of the present invention is that deterioration of image quality of a character image in an enlarged or reduced image can be prevented by using the character codes recognized in the character image.

Another advantage of the present invention is that a copy in a readable layout can be provided.

BRIEF DESCRIPTION OF THE DRAWINGS

These and other objects and features of the present invention will become clear from the following description taken in conjunction with the preferred embodiments thereof with reference to the accompanying drawings, and in which:

FIG. 14 is a diagram of the operation panel in N-in-1 mode;

FIG. 15A is a diagram of a copy in 2-in-1 mode.

FIG. 21 is a flowchart of calculation of magnification;

FIG. 22 is a flowchart of layout;

DETAILED DESCRIPTION OF THE PREFERRED EMBODIMENTS

Figure 1:
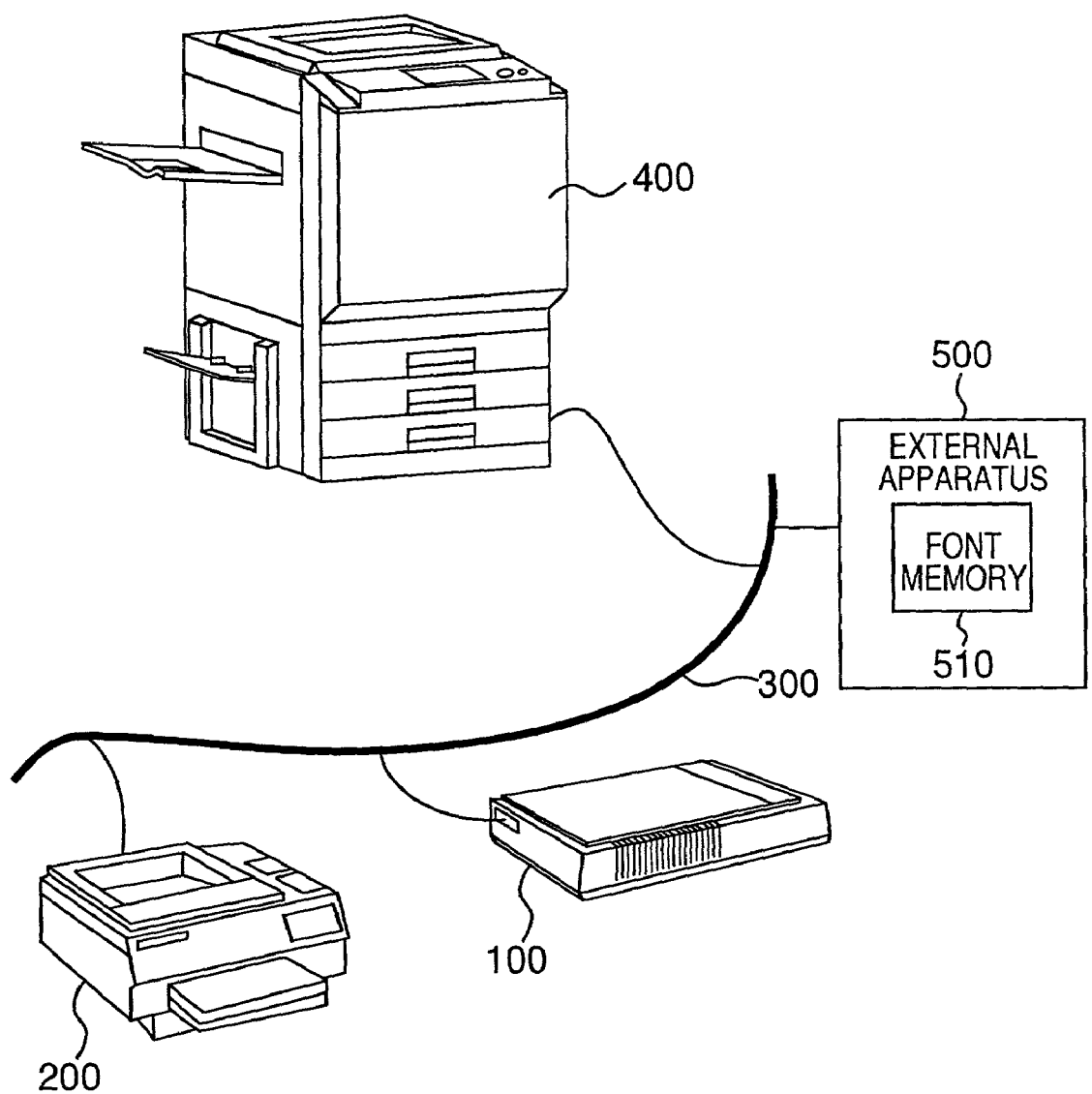
FIG. 1 is a diagram of a system according to a first embodiment of the invention.

Referring now to the drawings, wherein like reference characters designate like or corresponding parts throughout the several views, FIG. 1 shows a structure of a system according to a first embodiment of the invention. In this system, a scanner 100 reads an image of a document and sends the image data thereof, and a printer 200 receives the image data and forms an image on a sheet of paper. The scanner 100 and the printer 200 are connected through a network 300. Further, the network 300 is also connected to an external apparatus 500 such as a personal computer, a network printer or the like, and to a stand-alone digital copying machine 400. In the embodiments explained below, the printer 200 has a function of optical character recognition. However, the function may also be provided in the scanner 100, the external apparatus 500 or the digital copying machine 400. A digital camera, a film scanner or the like may be connected as an input apparatus to the network 300 instead of the scanner 100. Further, an apparatus such as a display device for displaying an image data may be connected to the network 300 as an output apparatus instead of the printer 200.

Figure 2:
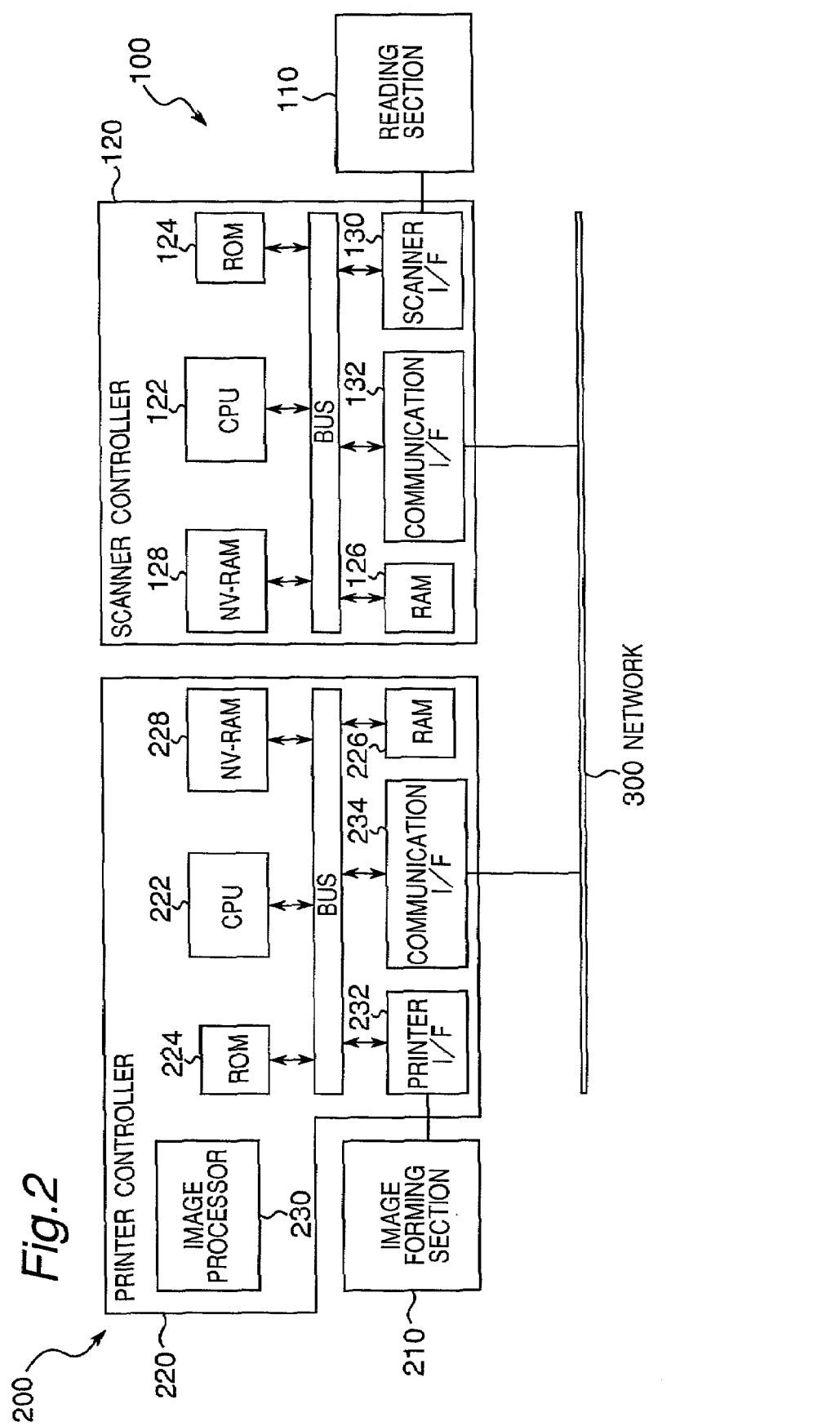
FIG. 2 is a block diagram of a structure of the system shown in FIG. 1.

FIG. 2 is a block diagram of a structure of the system shown in FIG. 1. The scanner 100 has a reading section 110 and a scanner controller 120 for controlling the reading section 110. The scanner controller 120 has a central processing unit (CPU) 122 which controls the entire scanner controller 120, a read-only memory (ROM) 124 for storing a program and the like, a random access memory (RAM) 126 for storing data temporarily, a non-volatile random access memory 128, a scanner interface 130 as an interface with the reading section 110 and a communication interface 132 as an interface with the network 300. On the other hand, the printer 200 has an image forming section 210 and a printer controller 220 for controlling the image forming section 210. The printer controller 220 has a central processing unit (CPU) 222 which controls the entire printer controller 220, a read-only memory (ROM) 224 for storing a program and the like, a random access memory (RAM) 226 for storing data temporarily, a non-volatile random access memory 228, an image processor 230 having a function of character recognition, a scanner interface 232 as an interface with the image forming section 210 and a communication interface 234 as an interface with the network 300.

Figure 3:
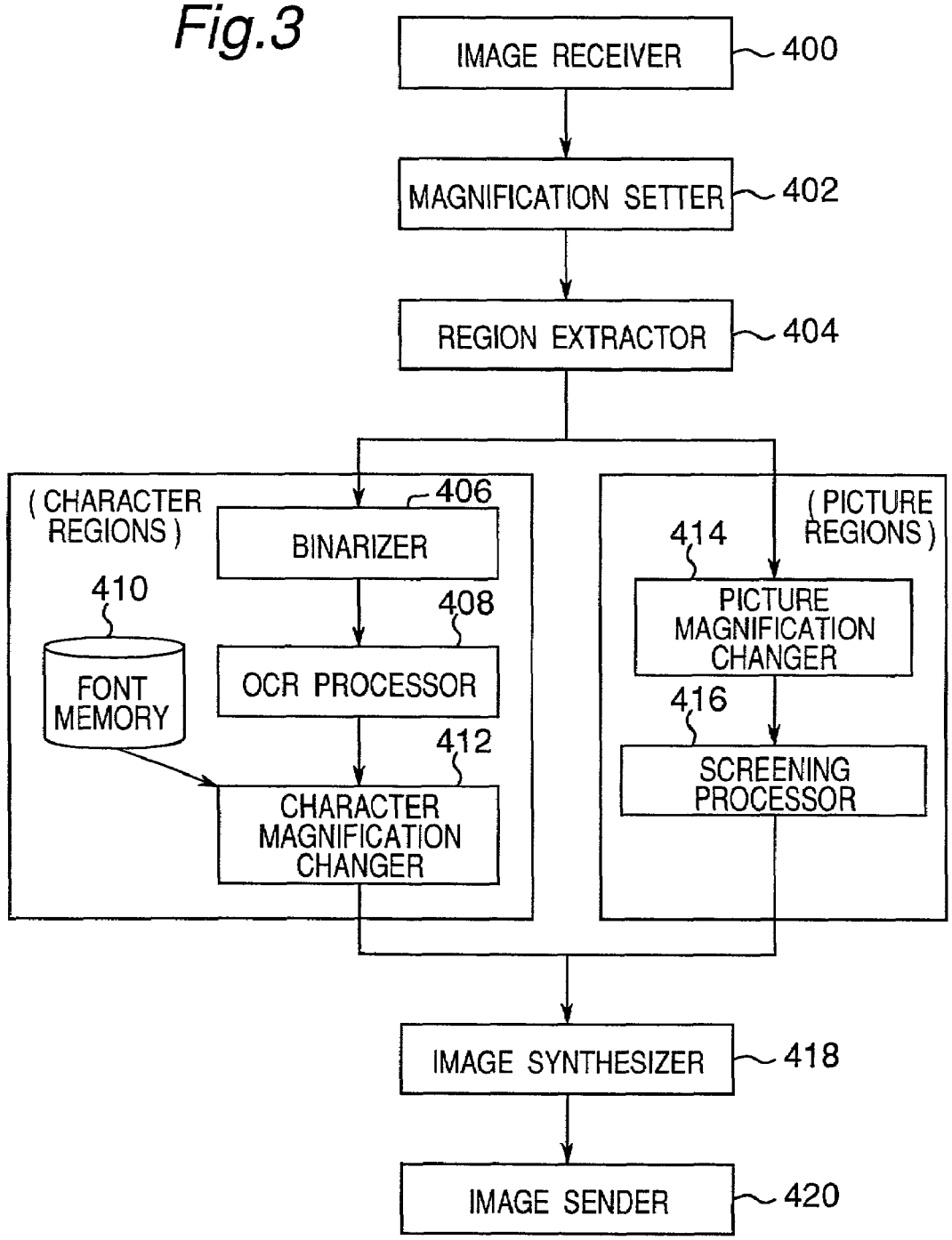
FIG. 3 is a diagram of image processing.
Figure 4:
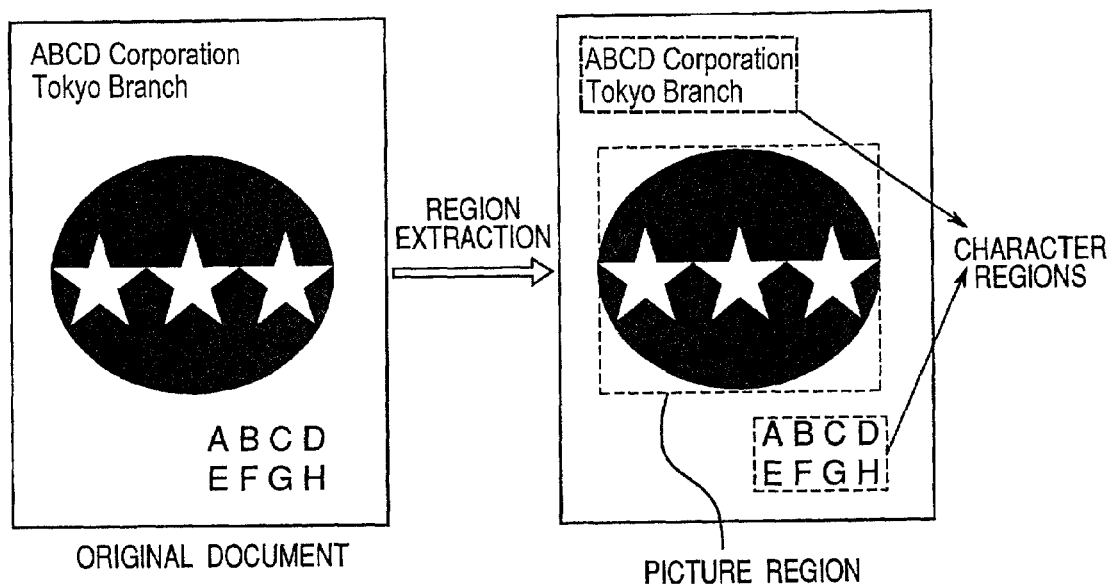
FIG. 4 is a diagram for explaining extraction of regions.

FIG. 3 is a diagram of image processing performed in the image processor 230 in the printer 200. An image receiver 400 receives image data through a bus, and a magnification setter 402 sets a magnification in correspondence to a value of the magnification set by a user in an operation panel (not shown) in the scanner 100 or the like. A region extractor 404 divides the input image data to character regions and picture regions. In the division, for example, a number of pixels decided as edges in an region is calculated, and if the number exceeds a threshold value, the region is determined as a character region, otherwise it is determined as a picture region. As shown in FIG. 4, the character and picture regions are recognized as rectangular regions (represented with dashed lines).

Image data in a character region obtained by the division is sent to a binarizer 406 wherein the image data is binarized. Character codes and character size are recognized in an optical character recognition (OCR) processor 408 in character images in image data in the character regions. A character magnification changer 412 enlarges or reduces the character size by selecting a font data among a plurality of font data of different sizes stored in a font memory 410. The font size is selected based on the recognized character codes and character size and the magnification set by a user, so that the characters are matched to or does not run over the character region.

On the other hand, a picture magnification changer 414 receives image data of the picture regions and performs an enlargement processing such as linear interpolation, cubic convolution interpolation or the like or to a reduction processing such as simple thinning. A screening processor 416 performs screening such as dither processing or error diffusion processing on the image data subjected to the magnification change.

Next, an image synthesizer 418 synthesizes the image data of the character regions subjected to the magnification change and those of the picture regions subjected to the screening and converts the character code data and the bit data to a general format such as portable document format of Adobe. An image sender 420 converts and sends the synthesized image, including the character regions subjected to the magnification change, to raster data with RIP processing or the like.

Figure 5:
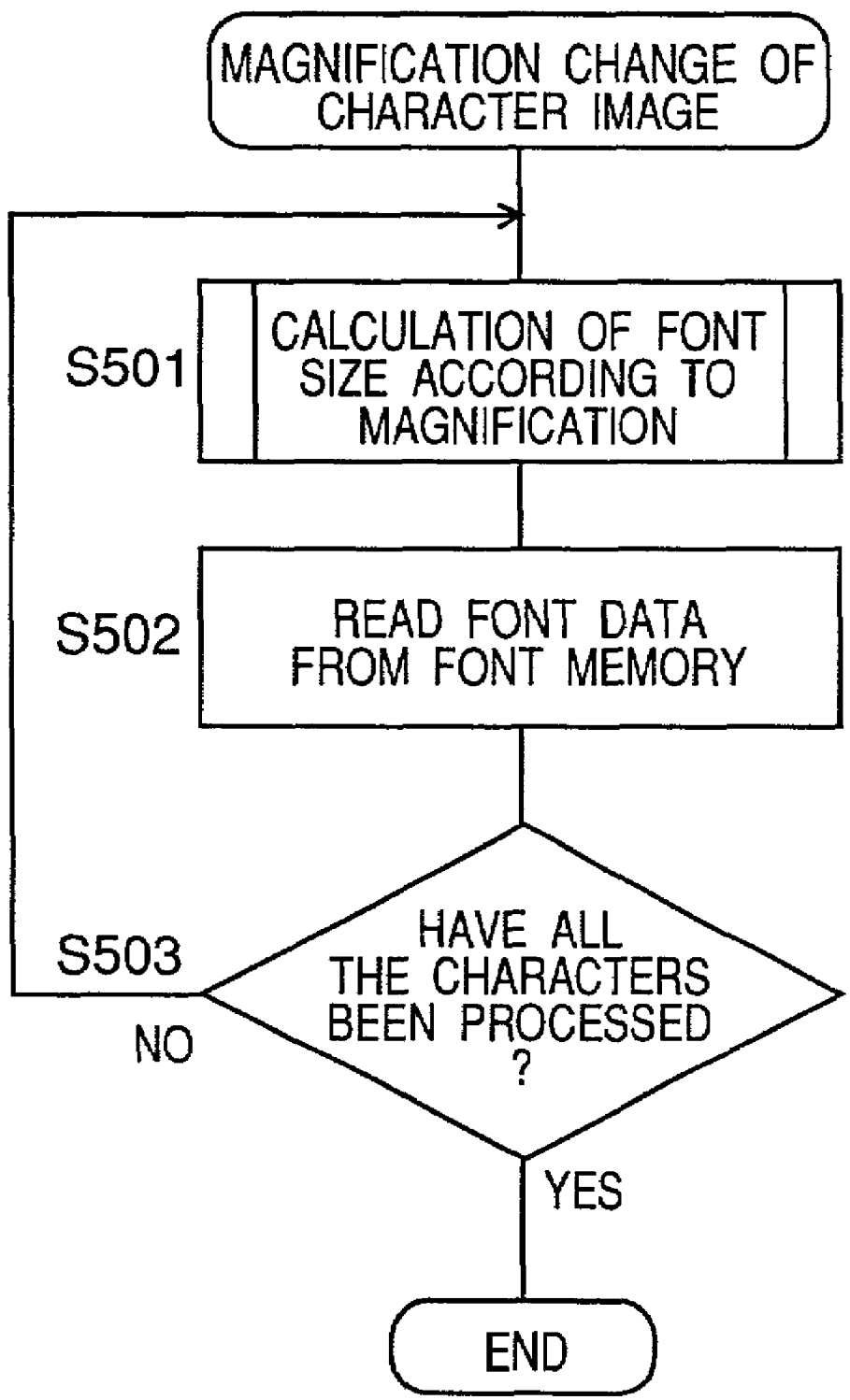
FIG. 5 is a flowchart of magnification change of character image.

Next, change in magnification of character image is explained. FIG. 5 is a flowchart of the magnification change of the character image in the character magnification changer 412. First, a font size to be outputted is calculated according to a value of the font size recognized by the optical character recognition multiplied by the magnification (S501). The calculation will be explained later. Next, font data of the font size calculated at step S501 is read from the font memory 410 (S502). The steps S501 and S502 are repeated until all the characters on which the character codes are recognized are processed (YES at step S503).

Next, the calculation of font size at step S501 is explained. A font size table as shown in Table 1 is stored in the ROM 224 for the calculation of the font size. The font size table includes width and height data in correspondence to font sizes of fonts such as MS gothic and MS Ming used popularly as Japanese fonts. In Table 1, data of representative fonts are compiled, but any other fonts may be stored by adding the width and height data in correspondence to font size. If the width and height are different in characters even for the same font, all the widths and heights can be compiled in the table. If data of the width and height are stored for all the characters, the magnification change can be performed more appropriately.

TABLE 1

Font size table

| Font | Size (point) | Width (mm) | Height (mm) |
|---|---|---|---|
| MS gothic | . . . | . . . | . . . |
|  | . . . | . . . | . . . |
|  | 10 | 3.5 | 3.5 |
|  | 11 | 3.8 | 3.8 |
|  | 12 | 4.2 | 4.2 |
|  | . . . | . . . | . . . |
|  | . . . | . . . | . . . |
|  | 15 | 5.2 | 5.2 |
|  | . . . | . . . | . . . |
|  | . . . | . . . | . . . |
| MS Ming | . . . | . . . | . . . |
|  | . . . | . . . | . . . |
| . . . | . . . | . . . | . . . |
| . . . | . . . | . . . | . . . |

Figure 6:
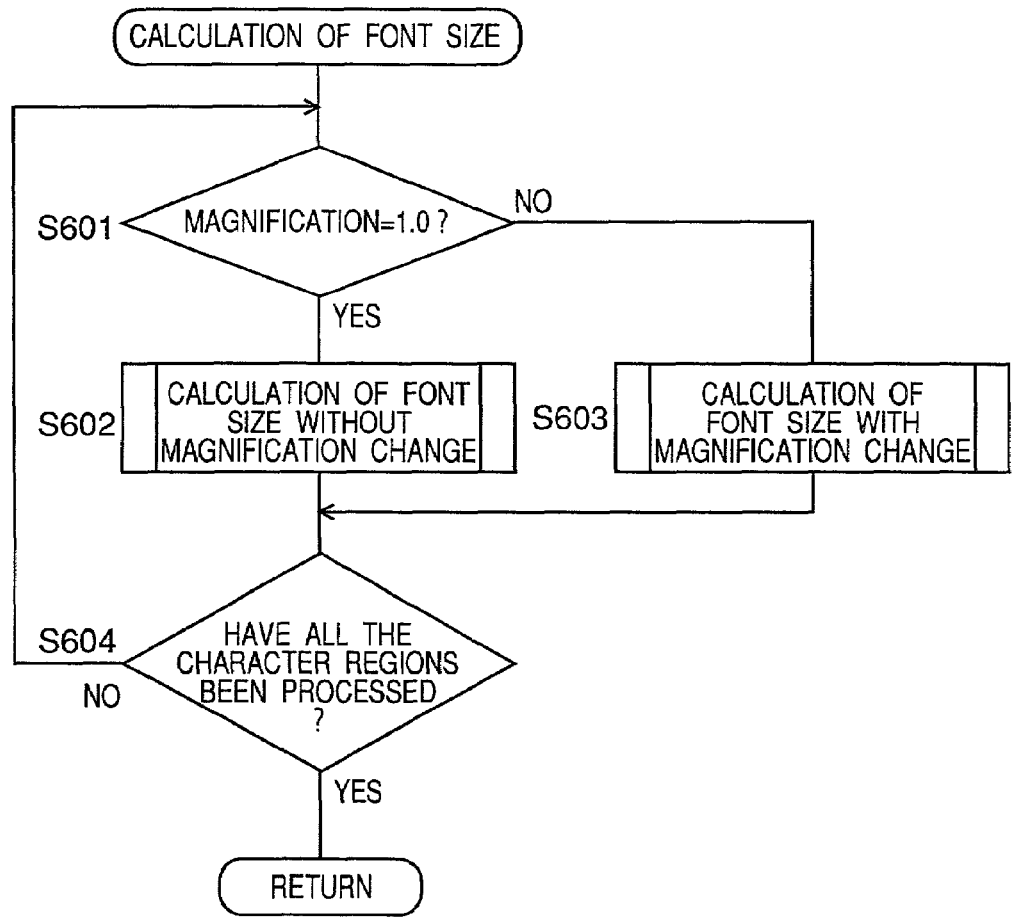
FIG. 6 is a flowchart of calculation of font size.

As shown in FIG. 6, the calculation of font size (S501 in FIG. 5) includes calculation of font size without magnification change and that for magnification change. First, it is decided whether the magnification set in the magnification setter 402 is 1.0 or not (S601). If the magnification is set to 1.0, the calculation of font size without magnification change is performed (S602), otherwise the calculation with magnification change is performed (S603). These calculations are performed in the unit of character region. The above-mentioned calculations are explained later in detail. After the calculation of font size is completed for a character region, it is decided next whether the calculation of font size is completed for all the character regions in a document (step S604). If the calculation have not yet been completed, the flow returns to step S601, and a next character region is processed. If the calculation is completed, the flow returns to the flow of FIG. 5.

Next, the calculation of font size without magnification change (S602 in FIG. 6) is explained with reference to FIGS. 7 and 8. It is assumed here that the recognition of font size in the optical character recognition is not sure. For example, if the OCR processor 408 recognizes erroneously that the font size is 12 points though the font size is actually 10 points, the character code data run over the character region. This problem is solved in this embodiment.

Figure 7:
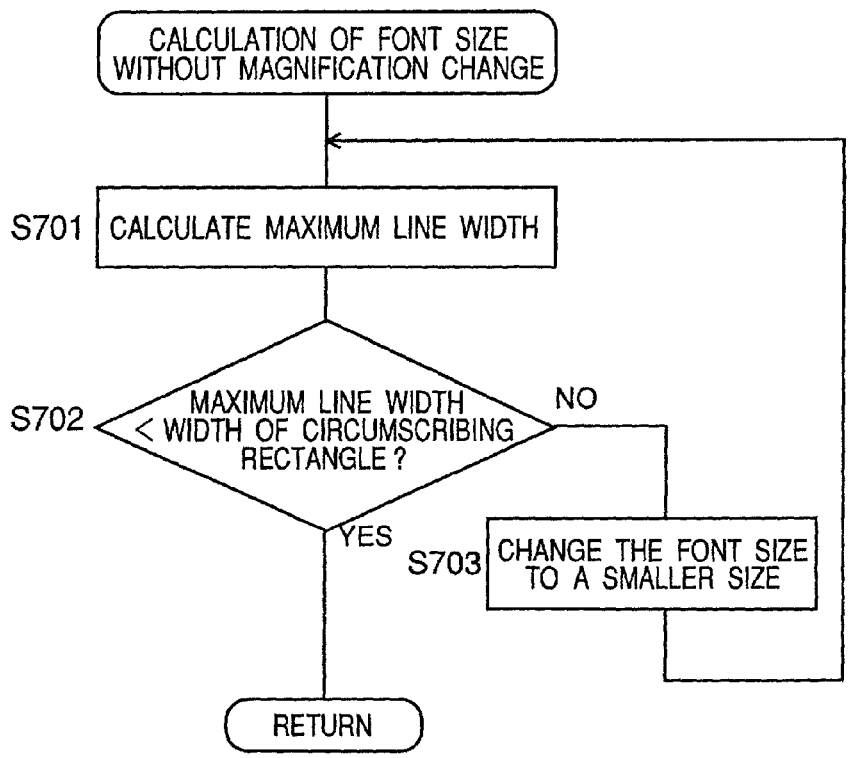
FIG. 7 is a flowchart of calculation of font size without magnification change.

In a flow shown in FIG. 7 on the calculation of font size without magnification change (S602 in FIG. 6), the maximum number of characters in a line in a recognized character region is multiplied with the recognized font size to determine a maximum line with (S701). Next, the calculated maximum line width is compared with a width of a circumscribing rectangle of the character region (S702). If the width of the circumscribing rectangle is not larger than the maximum line width (NO at step S702), the font size (default output font size) recognized by the OCR processor 408 is corrected according to a following formula (S703).

Font size after correction=default output font size
*(width of circumscribing rectangle)/(maximum line with).

Figure 8:
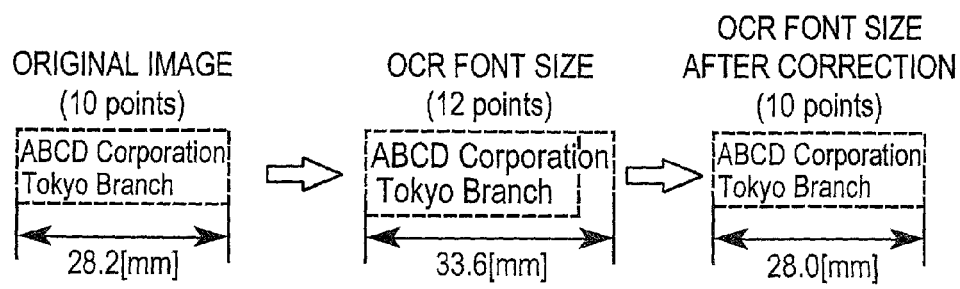
FIG. 8 is a diagram for illustrating change in font size.

An example shown in FIG. 8 is explained. In the OCR processor 408, the width of a circumscribing rectangle in a character region in the original image (left part in FIG. 8) is recognized as 28.2 mm and the maximum number of characters in a line is recognized as 8. IF the recognized font is MS gothic and the recognized font size is 12 points (4.2 mm of height in Table 1), the maximum line width is 33.6 mm (middle part in FIG. 8). Therefore, the maximum line width is larger than the width of the circumscribing rectangle, so that the font size is changed according to the above formula.

Font size after correction=12*(28.3/33.6)=10.07.

By rounding the number below the decimal point, the font size after correction is decreased to 10 points (right part in FIG. 8).

Figure 9:
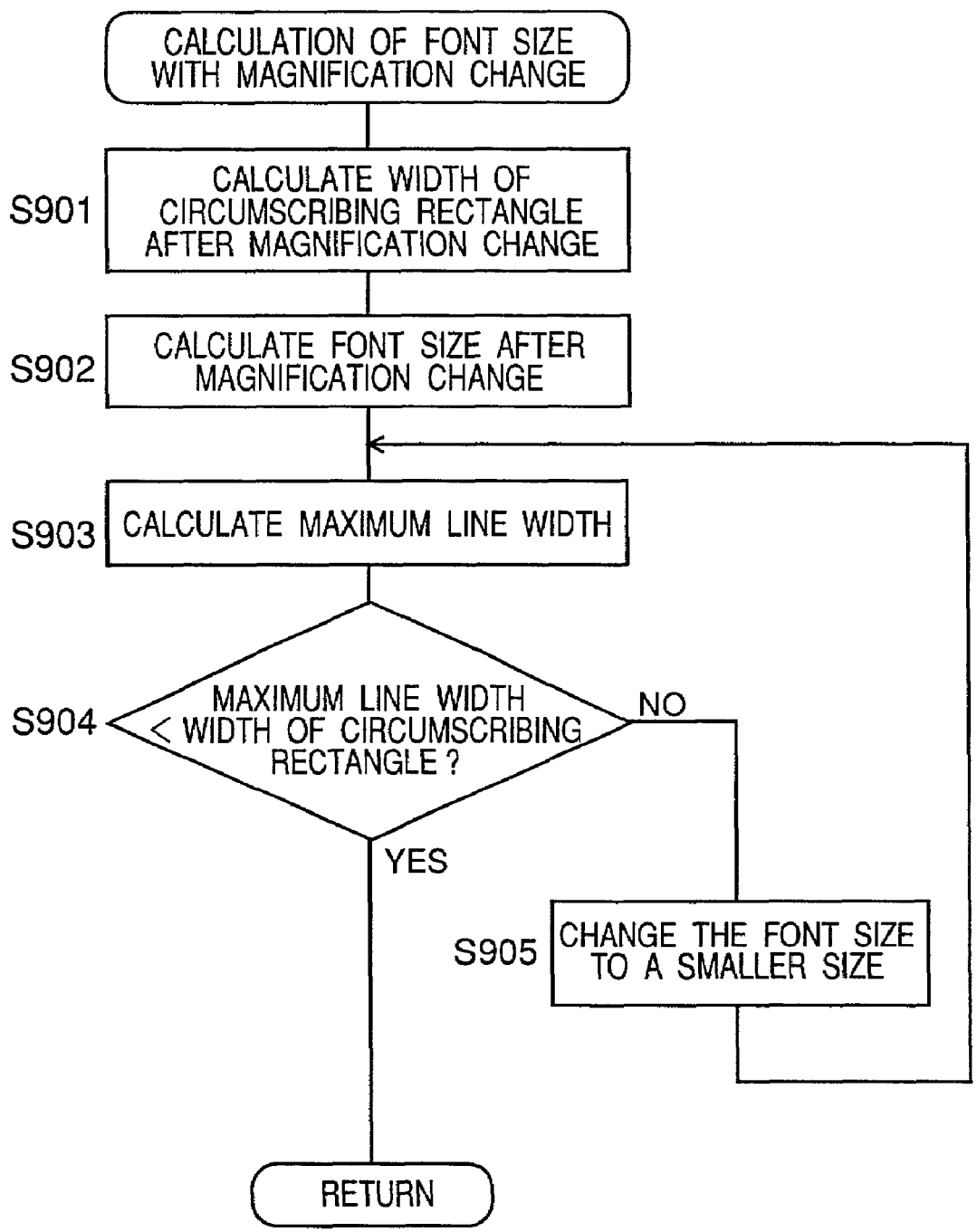
FIG. 9 is a flowchart of calculation of font size with magnification change.

Next, the calculation of font size with magnification change (S603 in FIG. 6) is explained with reference to FIG. 9. First, the width of circumscribing rectangle of a character region recognized by the OCR processor 408 is multiplied with a magnification inputted in the operation panel of the scanner 100 or the like to determine the width of circumscribing rectangle after magnification change (S901). Next, the recognized font size is also multiplied with the magnification to determine the font size after changing the magnification (S902). Then, similarly to the calculation of font size without magnification change (FIG. 7), the maximum line width is calculated by using the font size after magnification change (S903), and the maximum line width is compared with the width of circumscribing rectangle after magnification change (S904). If the maximum line width is not smaller than the width of circumscribing rectangle (NO at step S904), the recognized font size is corrected according to the above-mentioned formula (S905).

In the flow explained above, an appropriate font size after magnification change is determined by using the width of circumscribing rectangle. By comparing further the maximum column height with the height of circumscribing rectangle, the output character code data can be contained surely in the character region.

Figure 10:
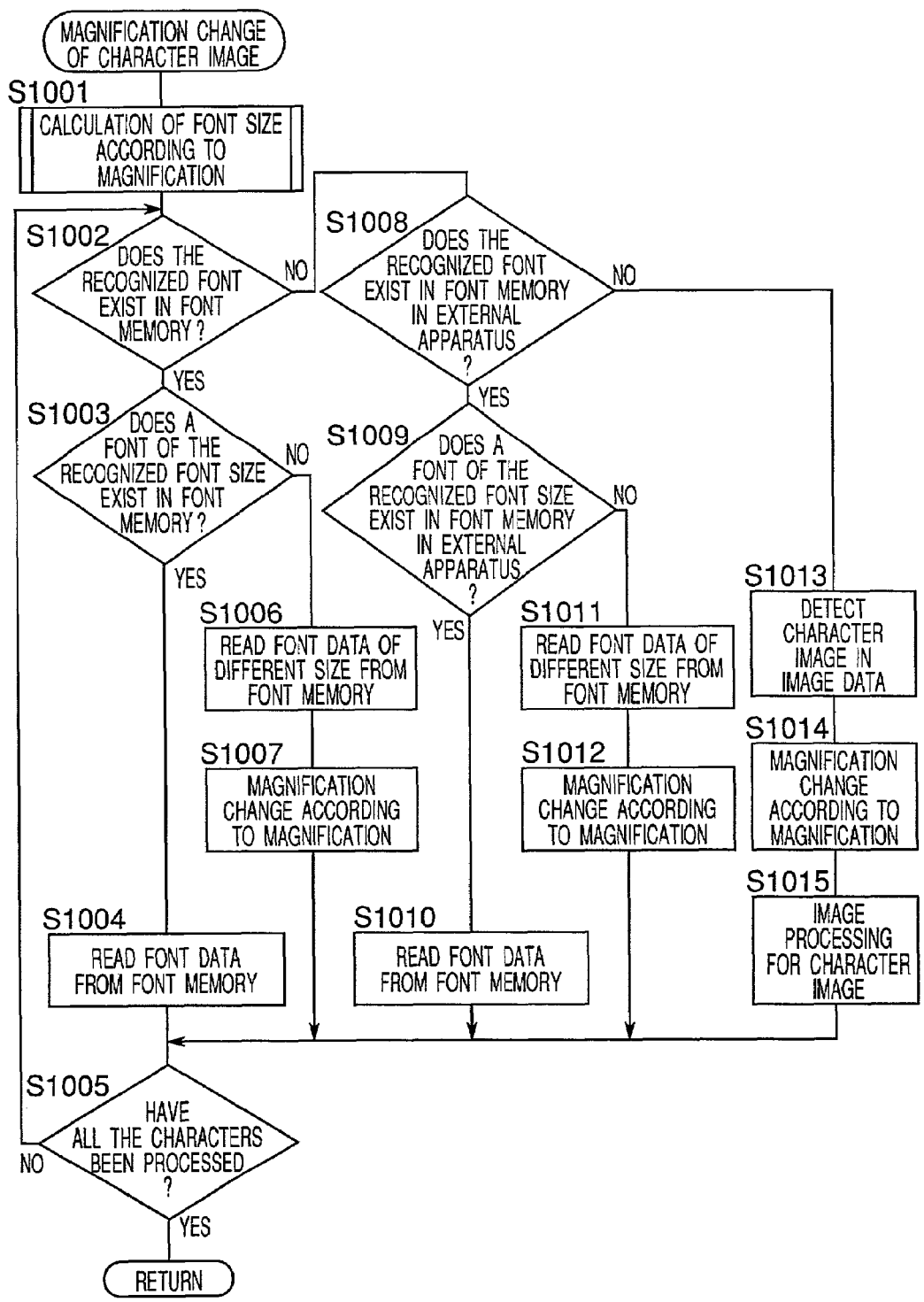
FIG. 10 is a flowchart of change in magnification of characters in a different embodiment of the invention.

Next, another embodiment is explained for a case wherein the recognized font is not included in the font memory 410. FIG. 10 shows a flow of magnification change of character image in this case. First, an output font size is calculated based on a value of the font size recognized with optical character recognition multiplied with a magnification (S1001). The calculation is similar to the above-mentioned calculation (S501 in FIG. 5), and explanation thereof is omitted here. Next, it is decided whether the recognized font exists or not in the font memory 410 (S1002). If the recognized font does not exist, it is decided whether the recognized font exists or not in the font memory 510 in an external apparatus 500 (FIG. 1) connected to the network 300 (S1008). If the recognized font exists in the font memory 510 in the external apparatus 500, it is decided next whether a font of a font size in correspondence to the magnification is included or not in the font memory 510 in the external apparatus 500 (S1009) If the font of the font size exists, the font is read from the font memory 510 (S1010). If the font of the font size is not included, a font having the most closest size is read from the font memory 510 (S1011), and an enlargement processing such as linear interpolation, cubic convolution interpolation or the like or to a reduction processing such as simple thinning is performed on the font (S1012).

If it is decided at step S1008 that the recognized font does not exist in the font memory 510 in the external apparatus 500, a character image is extracted from the original image data (S1013), and a magnification change processing similar to step S1012 is performed (S1014), and image processing such as edge emphasis for character image is performed (S1015).

If it is decided at step S1002 that the recognized font does not exist in the font memory 410, it is decided next whether a font of the font size in correspondence to the magnification exists or not in the font memory 410 (S1003). If the font of the font size exists, the font is read from the font memory 410 (S1004). If it does not exist, a font having the most closest size is read from the font memory 410 (S1006), and a magnification change processing similar to step S1012 is performed (S1007). When the magnification change of one character is completed, it is decided whether the magnification change is completed on all the characters (S1005). When the magnification change has not yet been completed on all the characters, the flow returns to step S1002, and a next character is processed. When the magnification change has been completed on all the characters, the flow returns to the main routine.

In this embodiment, when the recognized font does not exist in the font memory 410, it is read from the font memory 510 in the external apparatus 500. The external apparatus 500 may be another printer, a web server or the like.

Further, in this embodiment, enlargement and reduction of character image with use of character recognition function is explained. The processing for enlargement and reduction may be applied to a copy in a saving mode such as N-in-1 mode where images of N pages are reduced and outputted in a sheet of paper. Further, it may also be applied to a copy in a mode where the output copy in the saving mode is enlarged to N pages.

In the above-mentioned embodiment, documents in Japanese are subjected to enlargement or reduction. However, documents in other languages such as English can also be processed similarly. In this case, the OCR processor 408 for the language is used, and the font data table stores width and height data in correspondence to font sizes of fonts for the language.

It is an advantage of the above-mentioned embodiments that when the magnification of an image is changed, deterioration of quality of an output character image is prevented by recognizing and encoding characters in a document with a character recognition function and by using font size data on the encoded data of the recognized characters stored in a font memory.

Figure 11:
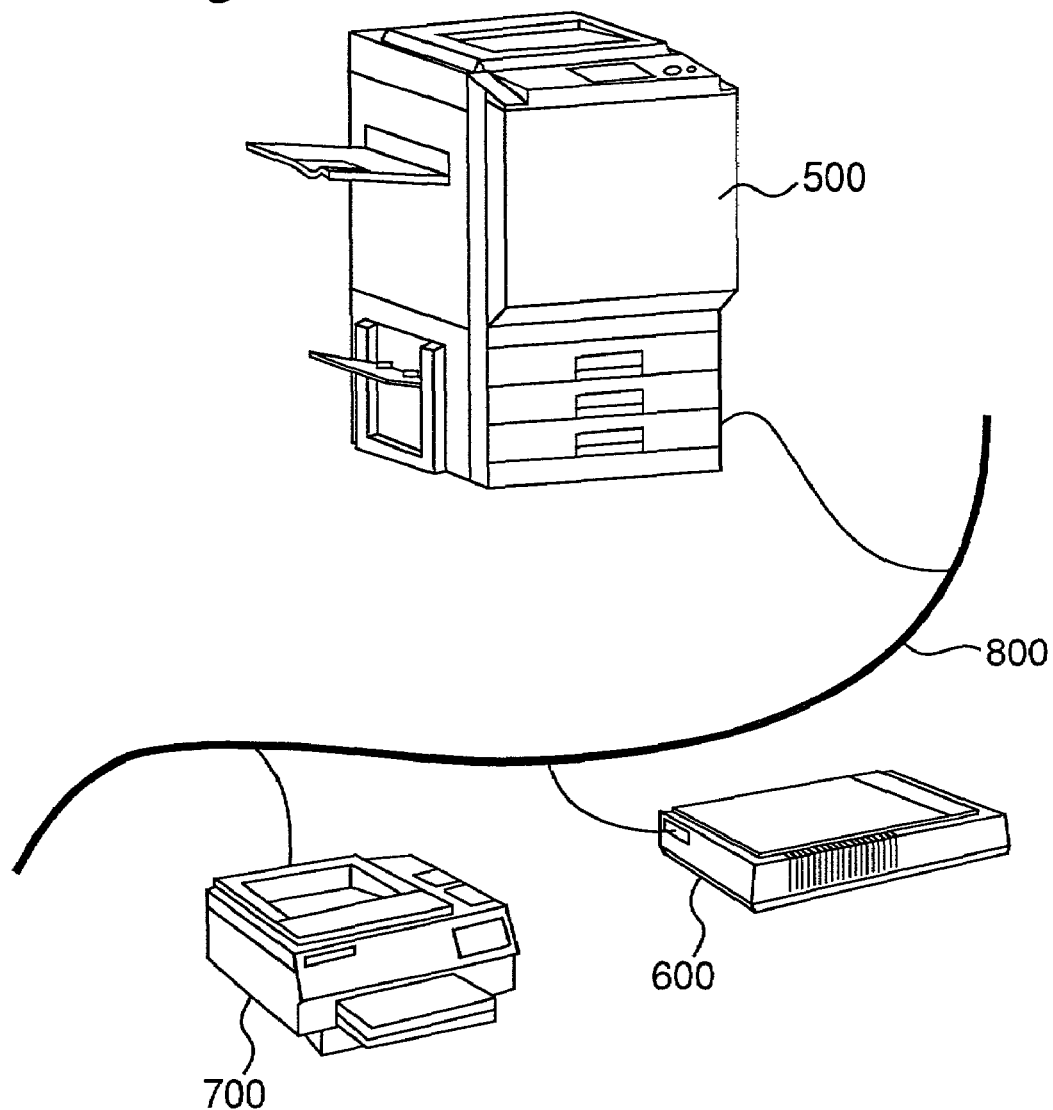
FIG. 11 is a diagram of a copy system connected to a network and a stand-alone digital copying machine.

Next, a third embodiment of the invention on saving modes is explained. In this embodiment, image data of N pages are formed in M sheets of paper, wherein N and M are natural numbers and N is not equal to M. In a saving mode where N is larger than M, reduction of digital image data is performed similarly to the above-mentioned embodiments. This embodiment can be applied to a copy system including an image input apparatus 600 and an image forming apparatus (printer) 700 connected to a network 800 as shown in FIG. 11. It can also be applied to a stand-alone digital copying machine 500 shown in FIG. 11. Further, it can be applied to the stand-alone image forming apparatus 700 shown also in FIG. 11. The stand-alone digital copying machine 500 is explained below as an example of this embodiment.

Figure 12:
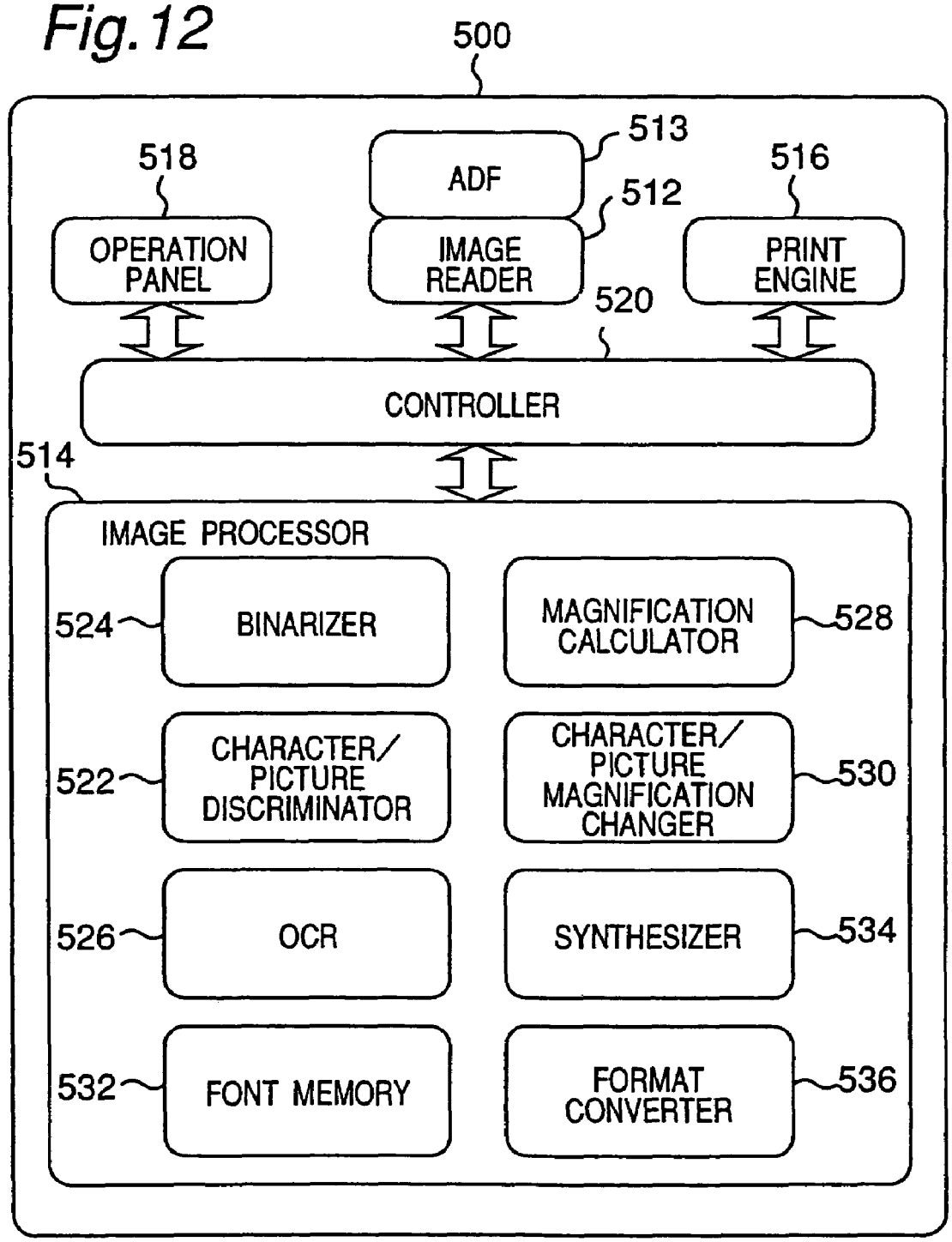
FIG. 12 is a block diagram of the digital copying machine according to a second embodiment of the invention.

FIG. 12 shows the structure of the digital copying machine 500 schematically. In the digital copying machine 500, an image reader 512 reads a document, an image processor 514 generates print data based on the image data, and a print engine 516 prints an image based on the print data on a sheet of paper. An operation panel 518 is provided to set various values on saving modes such as a number of copies, a number N for N-in-1 mode, a paper size, a saving rate or the like. A controller 520 controls the above-mentioned components.

The image reader 512 has an automatic document feeder (ADF) 513. When the image reader 512 is operated for reading, documents put on the automatic document feeder 513 are fed one by one to read position and an image of each document is read.

The digital copying machine 500 can perform optical character recognition (OCR) for reproducing a character image in a character region based on character code data thereof. In the image processor a character/picture region discriminator 522 separates an image data received from the image reader 512 into character regions and picture regions (including photograph regions). The character and picture regions are discriminated as rectangular regions. A binarizer 524 binarizes data in the character regions, and an OCR processor 526 converts characters in the bi-level data to character codes by using optical character recognition. A magnification calculator 528 calculates magnification based on the setting values of the number of copies, the number N for N-in-1 mode, paper size, saving rate or the like. A font memory 532 stores data of a plurality of kinds of fonts of various font sizes. A character/picture magnification changer 530 selects a font size according to the magnification calculated by the magnification calculator 528 and outputs character code data. Thus, the magnification of a character image can be changed. On the other hand, as to a picture region, the image data is changed according to the calculated magnification. A synthesizer 534 synthesizes the character and picture regions after the magnification change, and format converter 536 converts the character code data and the bit map data in a general format such as portable document format (PDF). If N-in-1 mode is set as a saving mode, the image synthesis is performed in a layout wherein a plurality of documents is printed in a sheet of paper. The print engine 516 converts the received image data synthesized by the synthesizer 534 to raster data and forms it on a sheet of paper.

Figure 13:
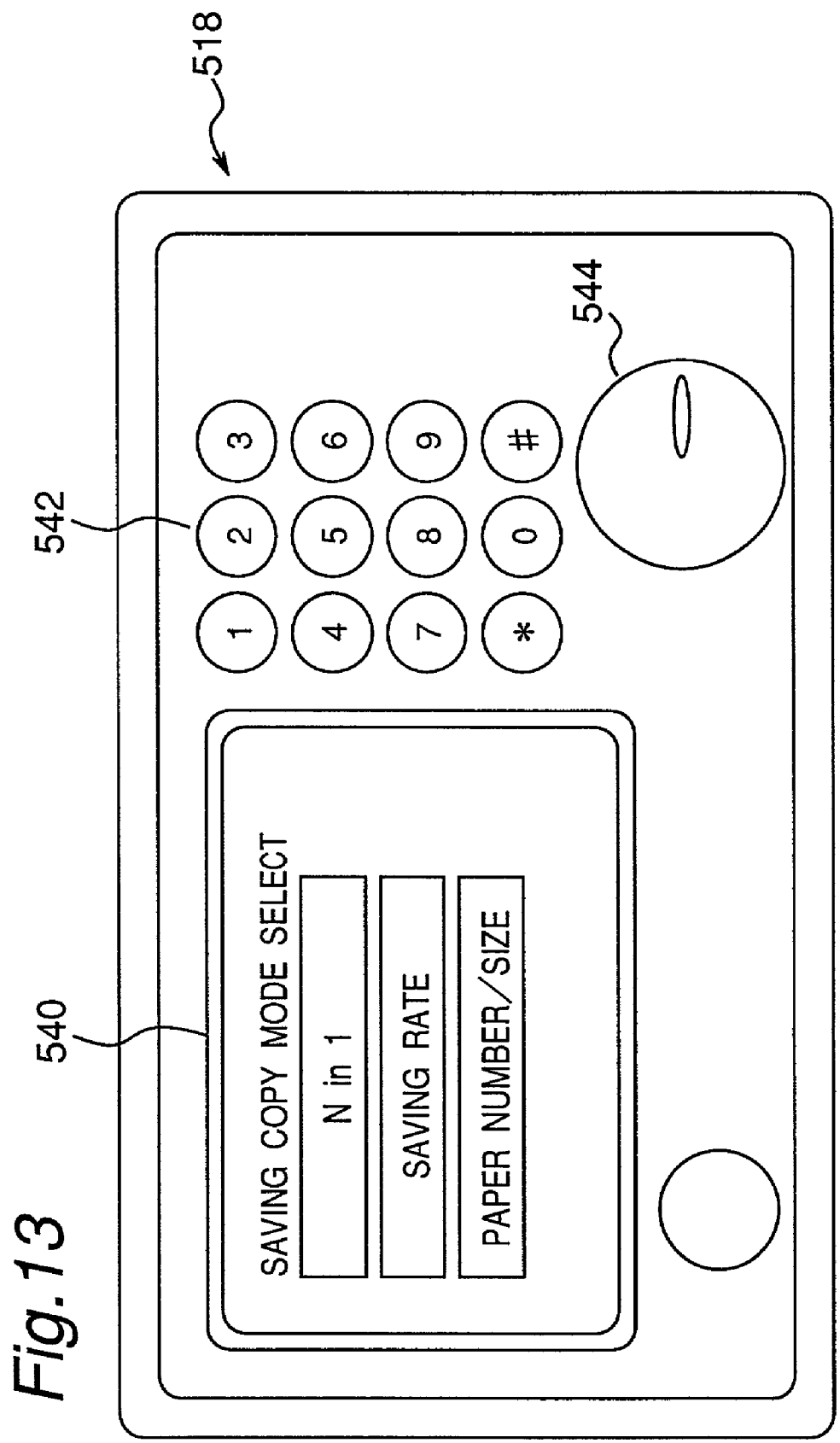
FIG. 13 is a diagram of an operation panel.

FIG. 13 shows the operation panel 518 of the digital copying machine 500. A display unit 540, a liquid crystal touch panel, has a screen, and copy mode can be changed according to a touch by a user. In an example shown in FIG. 13, a screen for selecting a saving copy mode is shown in the display unit 540. In the screen for selection, a user can select one of the saving modes of N-in-1 mode, saving rate mode and paper number/size mode. The operation panel 518 has a start key 544 for starting a copy operation and ten-keys 542 for setting the number of copies or the like.

Figure 15B:
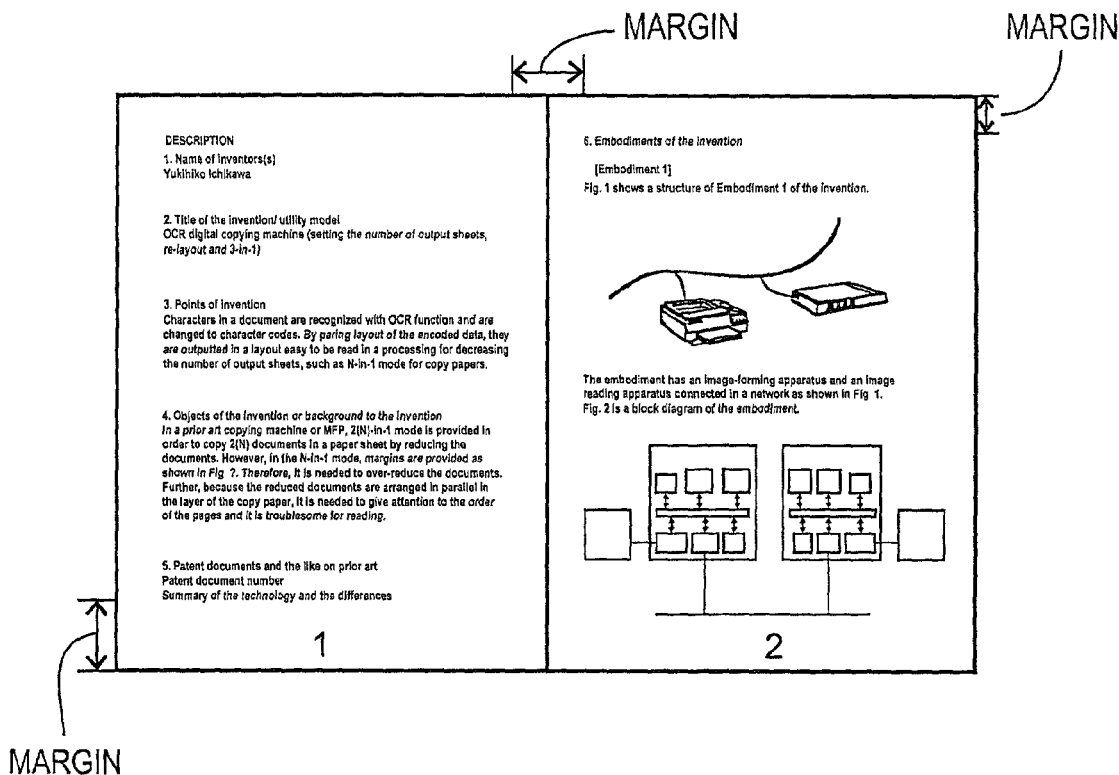
FIG. 15B is a diagram of a copy in a prior art 2-in-1 mode.

The saving modes are explained below. In the N-in-1 mode, images of N pages of documents are reduced and formed on a sheet of paper. FIG. 14 shows an example of the screen in the display unit 540. In this example, the number N of copies to be put together is set to 2. Thus, 2-in-1 mode is set wherein two documents are put together on a sheet of paper. In 2-in-1 mode, as shown in FIG. 15A, images of two documents or two pages shown above are reduced to an image in a sheet of paper shown below. Data in character regions in the two documents are converted to image data with use of font data according to the magnification based on character code data obtained with optical character recognition. Data in picture regions are also converted to image data according to the magnification. The character and picture regions are rearranged in a different layout by changing the number of lines, the number of character or the like in a sheet of paper. The image shown in FIG. 15A is quite different from a prior art example in 2-in-1 mode shown in FIG. 15B wherein the original images in two documents are reproduced by putting them side by side while reducing the size thereof. In the prior art example, original documents including a margin thereof is subjected to the reduction, and the margin of the two documents is reproduced at the periphery of a sheet of paper. Further, a white area extends along a center line in correspondence to the adjacent margins of the two documents. Further, two portrait documents are changed to a landscape document.

In a prior art image forming apparatus such as a digital copying machine, N-in-1 mode can be set only if the number of documents N is an even number. However, in this embodiment, the number N is not limited to an even number because the contents of N documents are rearranged by using the result of optical character recognition.

Figure 16:
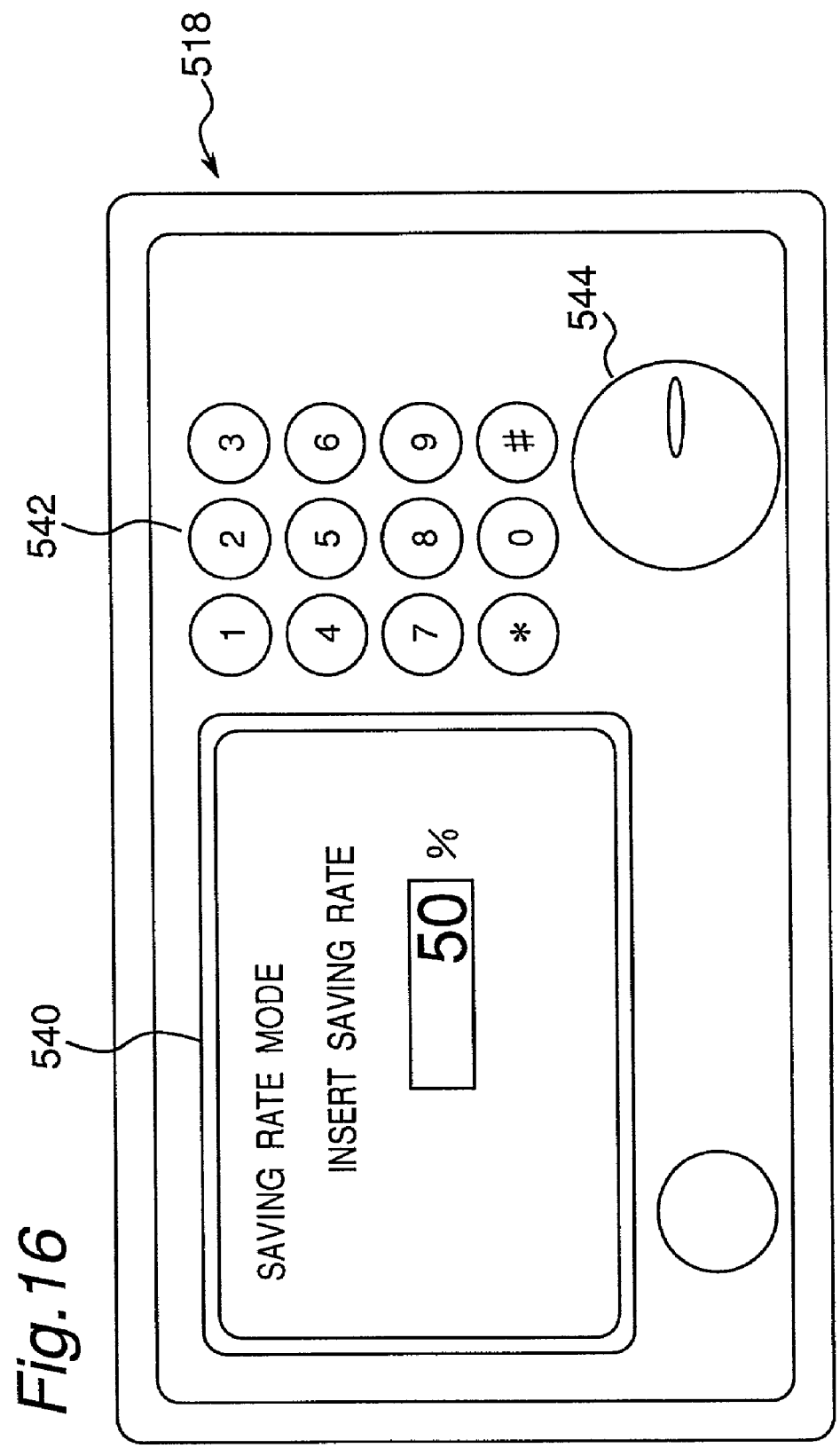
FIG. 16 is a diagram of a screen in the operation panel in saving rate mode.

In the saving rate mode, the number of copies is decreased according to a saving rate which represents a numerical value in per cent to which the number of documents is decreased. The saving rate is set in the screen of the display unit 540 in the operation panel 518. For example, as shown in FIG. 16, when the value of saving rate is set to "50" %, document images are reduced and rearranged so that the number of output papers is reduced to 50% of the number of the original documents. Similarly to the above-mentioned 2-in-1 mode shown in FIG. 15A, images of two documents are reduced to an image in a sheet of paper of the same size.

Figure 17:
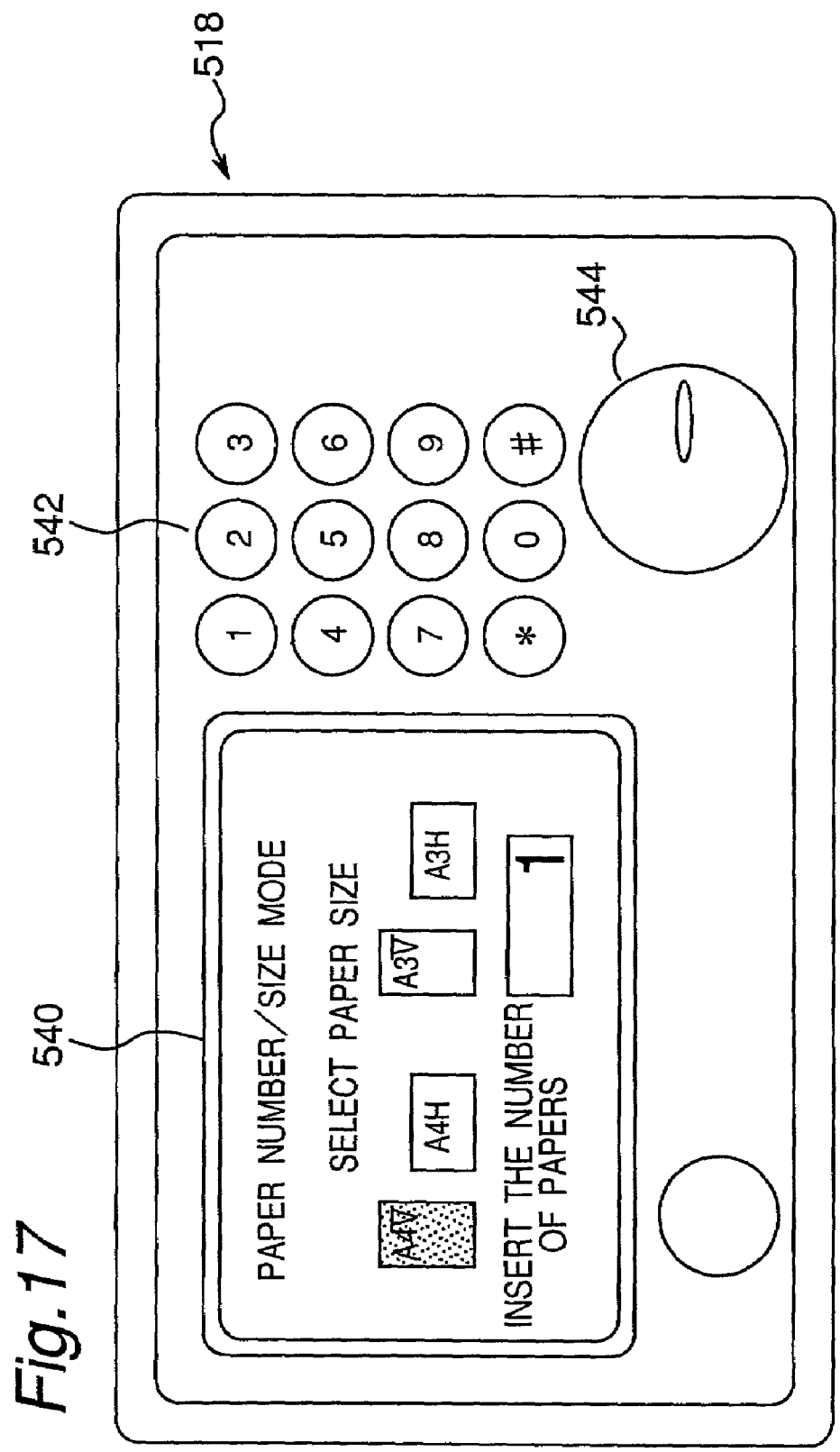
FIG. 17 is a diagram of a screen in the operation panel in a paper number/size mode.

In the paper number/size mode, in order to decrease the number of copies, it is set what number of sheets of paper image data obtained by reading documents are formed in, and what size of paper the image data are formed in. In an example shown in FIG. 17 in the screen of the display unit 540, paper size of "A4V" (vertical or portrait A4 size) is selected and the number of copies is set to "1". Then, images of two documents are reduced to an image in a sheet of paper of A4 size as shown in FIG. 15A. In this mode, the number of documents to be read is not cared.

In these saving modes, the contents of two documents are not arranged simply in the left and right sides in a sheet of paper, as in the prior art example shown in FIG. 15B. Character regions in the two documents are converted to character code data as a font in correspondence to the magnification, and picture regions are converted to image data in correspondence to the magnification. Then, the character and picture regions are re-arranged in a layout in a sheet of paper by changing the number of lines, the number of characters or the like. Therefore, a copy is obtained, without changing the direction of document images in a sheet of paper and without excessive margin, in a layout which can be filed easily and can be read easily.

Figure 18:
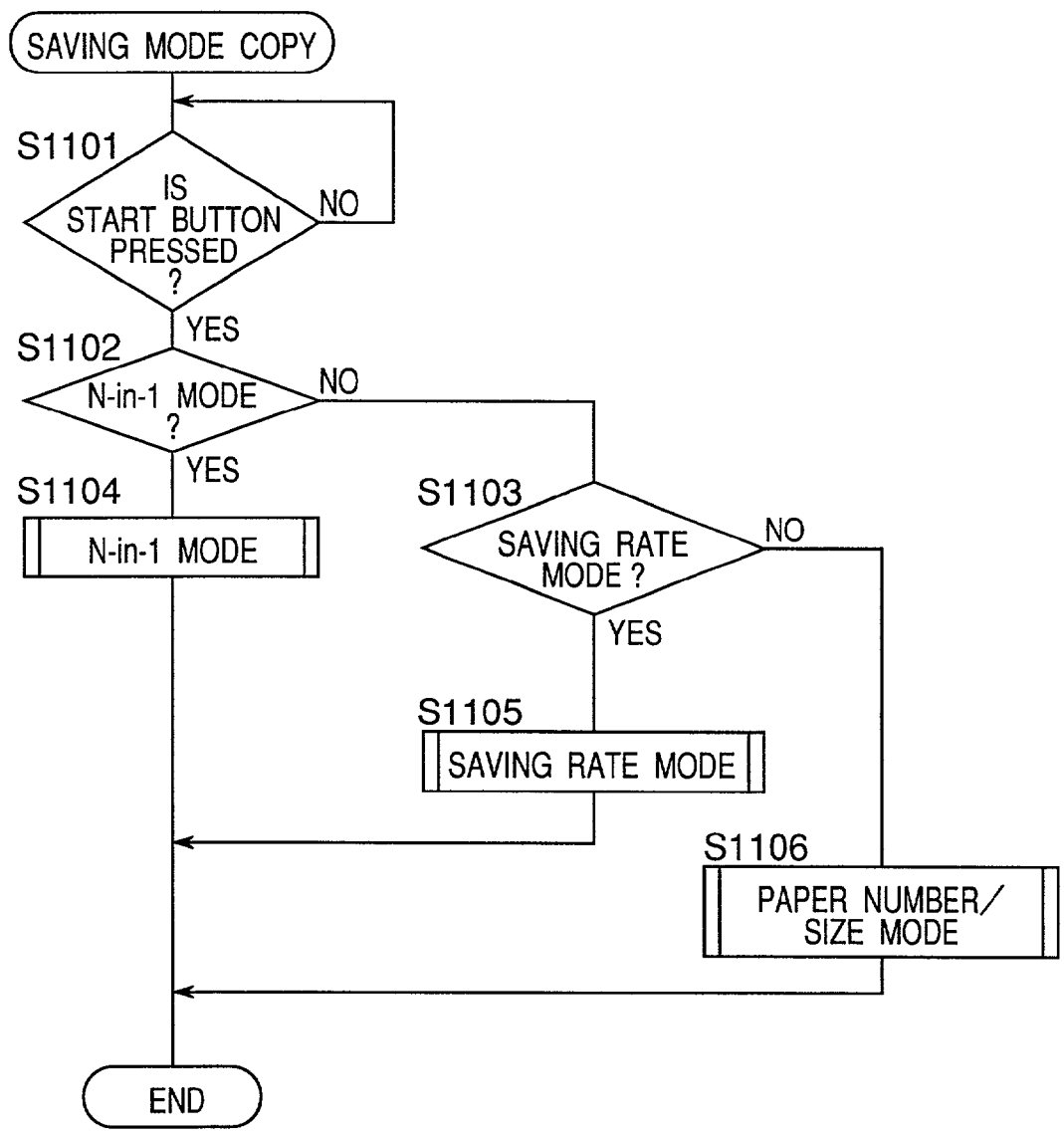
FIG. 18 is a flowchart of saving modes.

Next, the operation of the controller 520 is explained. FIG. 18 shows a flowchart when a saving mode is selected. This flow includes processing of the components in the image processor 514. When it is decided that the start key 544 in the operation panel 518 is pressed (YES at S1101), it is decided which saving mode is selected in the N-in-1 mode, saving rate mode and paper number/size mode (S1102 and S1103), and the flow comes to a subroutine for the selected mode (S1104, S1105 or S1106).

Figure 19:
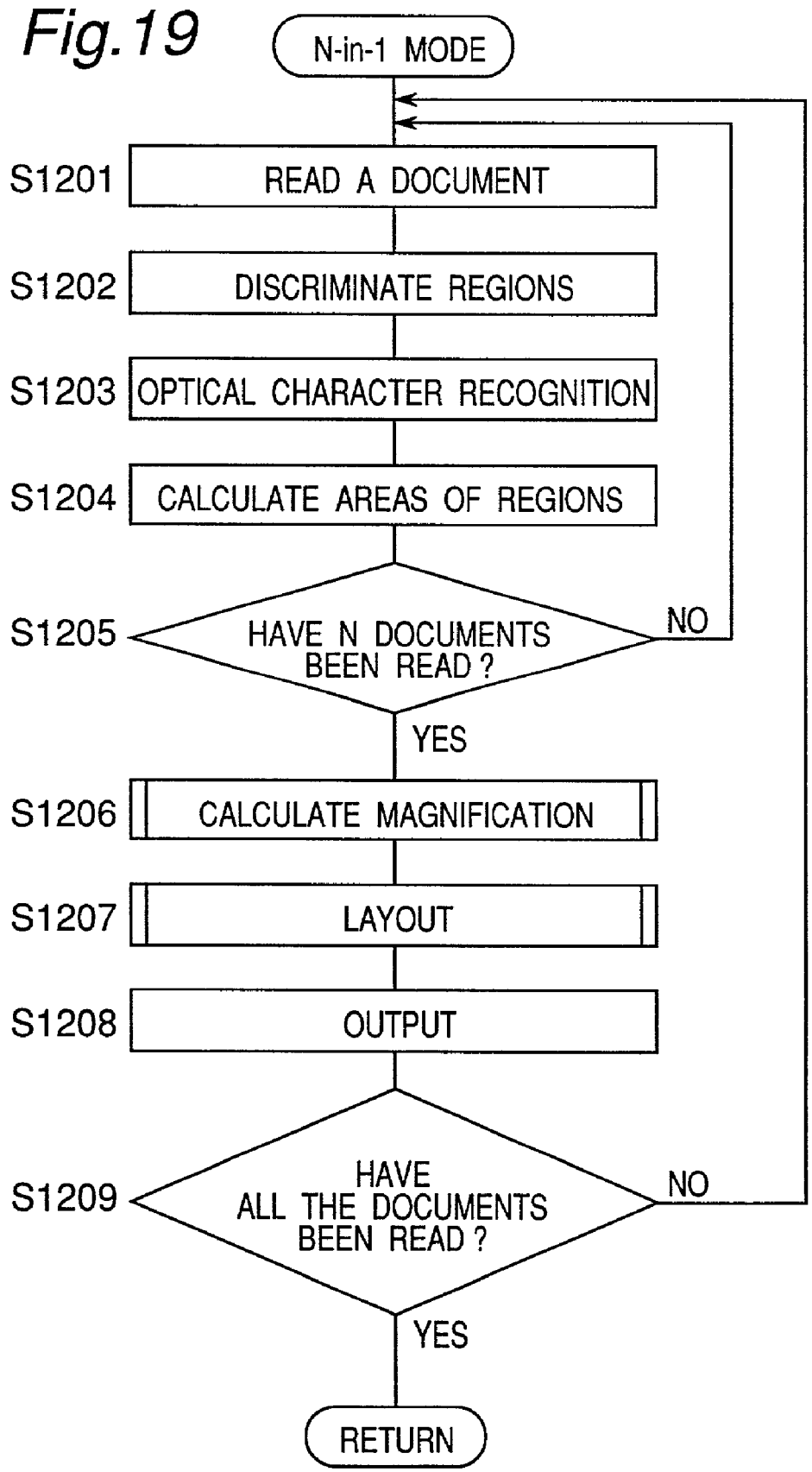
FIG. 19 is a flowchart of N-in-1 mode.

FIG. 19 shows a flow of the operation in the N-in-1 mode (S1104 in FIG. 18). When the start key 44 is pressed and the N-in-1 mode is set, the operation is started. First, N documents to be included in a sheet of paper are read one by one (S1201). Next, character and picture regions are discriminated in the document image (S1202) in order to separate the image data obtained by the reading into character and picture regions. In the region discrimination, a number of pixels decided to be at an edge is calculated in a region, and if the number exceeds a threshold, the region is decided as a character region, otherwise it is decided as a picture region. Next, optical character recognition is performed on the character regions (S1203). That is, image data in the character regions is binarized, and characters are recognized in the bi-level image of the character regions. The image data recognized as characters are converted to character code data. Next, an area of each region is calculated in order to determine a ratio of the area of the character regions to that of the picture regions to be printed on a sheet of paper (S1204).

Figure 20:
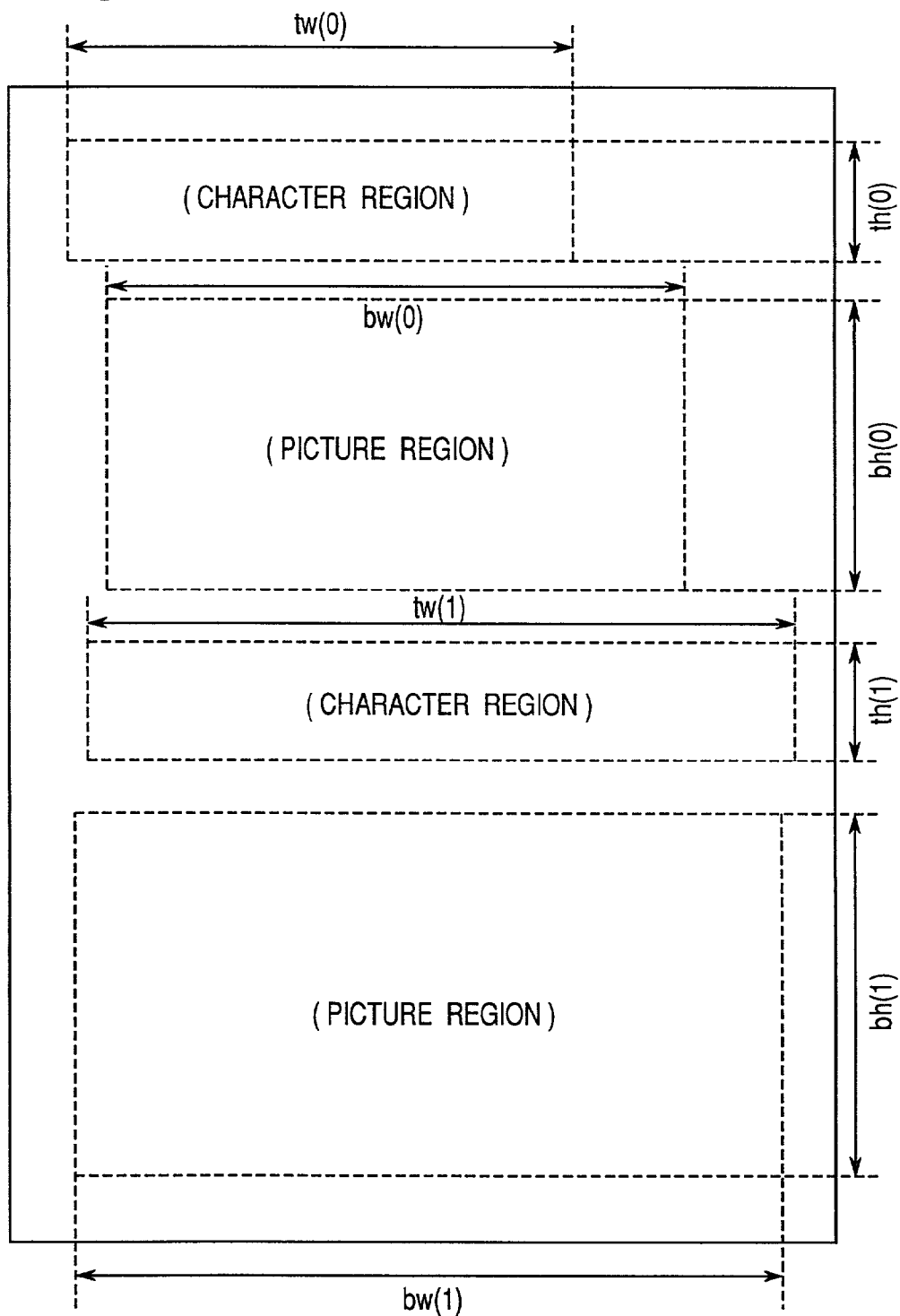
FIG. 20 is a diagram for illustrating height and width of character and picture regions.

The calculation of the area is explained here. As shown in an example in FIG. 20, in each document, the height "th" and width "tw" are determined for each character region, and the height "bh" and width "bw" is determined for each picture region. Then, the areas of the character and picture regions are calculated. In the example, two character regions and two picture regions are discriminated. The area of a character region is calculated based on a rectangle having a certain extension (represented with dashed lines). Alternatively, the image may be divided in the unit of a line or a character, and the area may be determined for each of the units.

Returning to the flowchart shown in FIG. 19, after N documents have been read, the magnification is calculated for each of the character and picture regions in N-in-1 mode (S1206), and the character images and the picture images subjected to the magnification change are arranged in a layout (S1207) and outputted for printing (S1208). The above-mentioned processing is repeated until all the documents have been read (YES at S1209).

FIG. 21 is a flowchart of the calculation of magnification (S1206 in FIG. 19). First, a sum "A" of the areas of the character regions and a sum "B" of the areas of the picture regions in the N documents are calculated, and a ratio thereof, $$\Sigma(th(i)*tw(i)):\Sigma(bh(i)*bw(i)) \ (=A:B),$$

is determined (S1301).

Next, the magnifications of the character and picture regions for the layout are determined according to the area ratio A:B (S1302). If a print area is denoted as S, the magnifications and the print areas for the character and picture regions are determines as follows.
magnification of character region: St/A.
print area of character region: St=S*A/(A+B).
magnification of picture region: Sb/B.
print area of picture region: Sb=S*B/(A+B).

In the layout, print positions of the characters and pictures may be arranged in the order appearing in the documents. In another way, the characters may be collected in a section, and the pictures may also be collected in another section.

Next, a font used for printing is selected in the fonts stored in the font memory 532 according to the magnification for the character regions (S1303). The font and font size have been recognized by the OCR processor 526, and the font size according to the magnification is calculated by using the magnification calculated by the character/picture magnification changer 530. The font size after magnification change is determined as the font size recognized by the OCR processor 526 multiplied with the magnification, as will be explained later in detail. Then, font data of the size calculated based on the font recognized by the OCR processor is read from the font memory 532. By using the necessary font data read from the font memory, deterioration of the quality of print of characters due to magnification change is prevented.

If a font of the necessary kind does not exist in the font memory 532, the character images are extracted from the document image, and they may be subjected to a magnification change processing such as an enlargement processing such as linear interpolation, cubic convolution interpolation or the like or a reduction processing such as simple thinning. Further, if a font of the necessary size does not exist in the font memory 532, a font of the same kind, but of a different size may be used by enlarging or reducing the font of the different size. That is, font data most similar to the calculated font size is read from the font memory 532, and the font data is enlarged or reduced so as to match with the calculated font size.

FIG. 22 is a flowchart of the layout (S1207 in FIG. 19). As to the picture regions, magnification change (for example, an enlargement processing such as linear interpolation, cubic convolution interpolation or the like, or a reduction processing such as simple thinning) is performed based on the calculated magnification (S1401) Then, character data in the character regions in an output paper are generated by using the selected font (S1402) Finally, the character and picture regions subjected to the magnification change processing are synthesized and converted to a file, for example, of portable document format (PDF) of Adobe (S1403). In the print engine 516, the PDF file obtained by the synthesis is converted to raster data with RIP processing, and the raster data is printed. Alternatively, the conversion to raster data of bit map format may be performed by the synthesizer 534.

Figure 23:
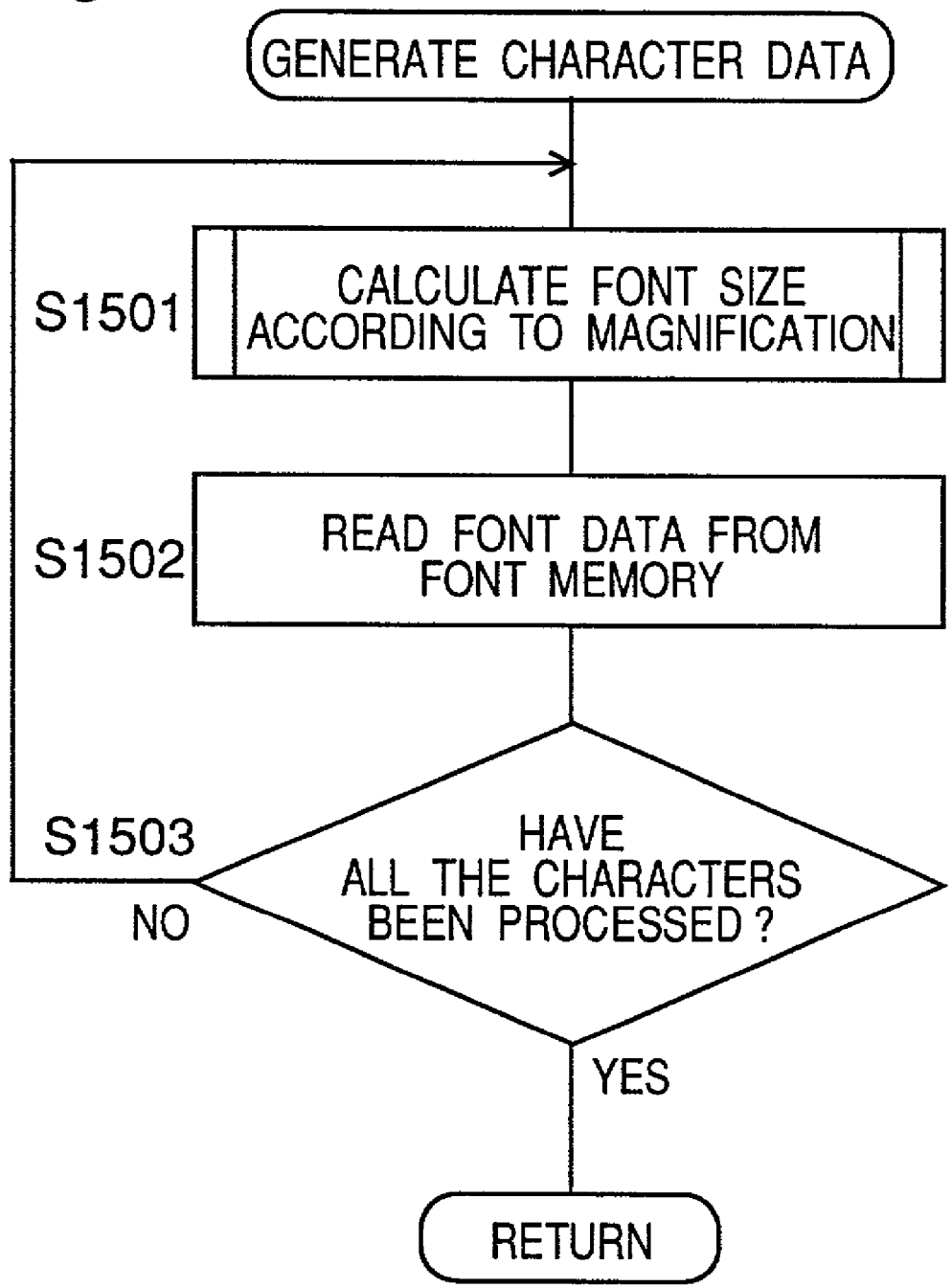
FIG. 23 is a flowchart of generation of character data.

FIG. 23 is a flowchart of the generation of character data (S1402 in FIG. 22). First, font size is calculated according to the magnification (S1501), and font data are read from the font memory 532 (S1502). Then, the steps S1501 and S1502 are repeated until it is decided that all the characters have been processed (YES at S1503).

Next, the calculation of font size (S1501 in FIG. 23) is explained. Data used in the calculation is explained first. The OCR processor 526 recognizes, besides the character codes in the character regions, the number of lines in a character region, the number of characters in a line, the kind of font and font size, and a size of a rectangle of character region. Further, a font size table such as Table 1 explained above is also stored in the font memory 532. The font size is calculated by using the data obtained by the OCR processor 526 and the data stored in the font table.

In this embodiment, the font size table stores data on representative fonts used popularly. However, it may store data on all the other fonts. Further, it may store data on all the font sizes. The width and height of font vary with a character, and this causes a problem on print quality. However, if the font size table includes data on the width and height of all the characters, the problem can be prevented.

Figure 24:
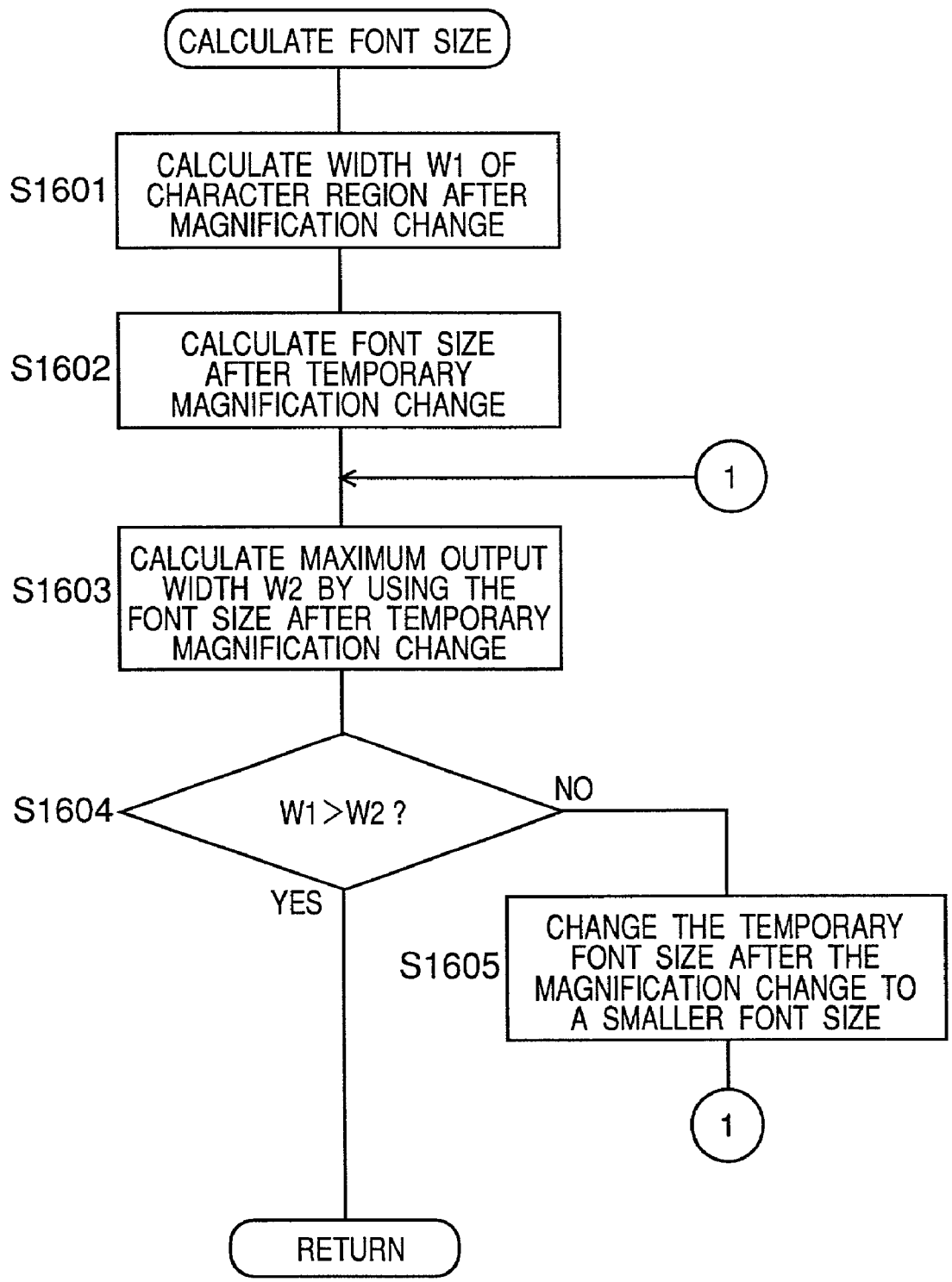
FIG. 24 is a flowchart of calculation of font size.

FIG. 24 is a flowchart of the calculation of font size (S1501 in FIG. 23). Width "W1" of character region after magnification change is obtained by multiplying the width of a circumscribing rectangle of a character region with the magnification (S1601). Next, the font size recognized by the OCR processor 526 is multiplied with the magnification to determine a temporary font size after magnification change (S1602). The term "temporary" is used because a font of different kind may be used when the recognized kind of font is not stored in the font memory 532. In such a case, the output characters are liable not to be contained in the character region after magnification change when a font size is determined simply at step S1601 by multiplying the font size recognized by the OCR processor 526 with the magnification. Further, a width "W2" of character region necessary after magnification change is calculated by multiplying the maximum number of characters in a line in the recognized character region with the font size after magnification change (S1603), and it is decided whether the width W2 of character region is included in the width W1 of character region obtained at step S1601 (S1604). If the characters can be included in the character region after the magnification by using the temporary font size, the temporary font size is set to the font size after the magnification change, and the flow returns to the flow shown in FIG. 23. Otherwise, the temporary font size is changed to a smaller font size (S1605), and the flow returns to step S1603. The font size after magnification change is determined as explained above.

Processings in the paper number/size mode and in the saving rate mode (S105 and S106 in FIG. 18) are generally similar to the flow shown in FIG. 19 on N-in-1 mode. The screens in the operation panel 518 are different from the counterparts in N-in-1 mode. Further, the magnification is calculated after reading all the documents. When the magnification is calculated, it may become necessary to calculate an area of the print region when the number of output papers becomes two or more. The other points are similar to the counterparts in N-in-1 mode, and the explanation thereon is omitted here.

Though this embodiment is explained on the stand-alone digital copying machine 500, the embodiment may be applied to a copy system having the image input apparatus (scanner) 600 and an image-forming apparatus (printer) 700 connected to the network 800 shown in FIG. 11. Further, it may also be applied to a stand-alone image forming apparatus 700.

In this embodiment, the saving mode is explained. This embodiment can also be applied to a case to recover the original copies from copies generated in a saving mode, as will be understood by a person skilled in the art. That is, when image data of N pages were formed in M sheets of paper (N>M) in a saving mode, character codes in the images of the M sheets of paper are read, and they are rearranged in a layout of N sheets of paper by using the font data for the recognized character codes selected in a font memory.

In this embodiment, characters are put in a layout with use of character code data obtained by the optical character recognition. Then, when characters are enlarged or reduced, they can be outputted in a layout which can be read easily by a user.

Further, deterioration of character image is prevented because when the magnification is changed, a character image is generated based on the character codes. For example, when an image is reduced, characters are not deformed. When the magnification of characters recognized by optical character recognition is changed, jaggies along contours of characters and deformation of characters can be prevented by using necessary font data stored in the font memory, based on the font size calculated according to the magnification.

Further, in a prior art image forming apparatus, N-in-1 mode for forming images of N documents in a sheet of paper can be set only when N is an even number. In this embodiment, N is not limited to an even number. Therefore, N-in-1 mode can be used more easily by a user.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:
   a code recognizer which recognizes character codes code from characters in a character region in a character image included in image data to be processed;
   a size recognizer which recognizes point size of the characters in the character image;
   a setter which sets a magnification;
   a magnification changer which enlarges or reduces the image data according to the magnification set by said setter;
   a memory section which stores a plurality of font data of different point sizes;
   a selector which selects font data of a particular point size from among the plurality of font data stored in said memory section based on the character codes recognized by said code recognizer, the font point size recognized by said size recognizer, the magnification set by said setter, and a size of a region of the character image in the enlarged or reduced image data;

wherein the selector first selects font data of a first particular point size based on the character codes recognized by said code recognizer, the font point size recognized by said size recognizer, and the magnification set by said setter, and then determines if a font data of a second particular point size is to be selected instead of the font data of the first particular point size based on the size of the region of the character image in the enlarged or reduced image data; and an output section which outputs the font data selected by said selector.

2. The image processor according to claim 1, further comprising a reading section which reads a document image to provide the image data to be processed.

3. The image processor according to claim 1, further comprising an image-forming section which forms an image on a recording medium based on the font data outputted by said output section.

4. The image processor according to claim 1, further comprising a communication section which communicates with an external apparatus, wherein said selector selects the compatible font data from among a plurality of font data stored in the external apparatus via the communication section.

5. The image processor according to claim 1, further comprising a size changer which changes the font size selected by said selector, based on the character size recognized by said size recognizer and the magnification set by said setter.

6. The image processor according to claim 1, wherein said magnification changer enlarges or reduces the character image based on the magnification set by said setter when font data in correspondence to the character code recognized by said code recognizer is not stored in said memory section.

7. The image processor of claim 1, wherein the size recognizer recognizes point size of characters by recognizing a font point size of the characters in a line in the character image, calculating the width of the line of the characters based on the width of the recognized font point size, measuring the actual width of the line of characters, comparing the calculated width to the actual width, and correcting the recognized point font size according to the ratio of the calculated width to the actual width.

8. An image processing method comprising:
recognizing character codes from characters in a character region of a character image included in image data to be processed;
recognizing a point size of the characters in the character image;
setting a magnification;
selecting font data of a particular point size from among a plurality of font data of different point sizes based on the recognized character code, the recognized font point sizes, the set magnification, and a size of a region of the character image in the magnified image data;
wherein font data of a first particular point size is first selected based on the recognized character codes, the font point size recognized by said size recognizer, and the magnification set by said setter, and a determination is then made to determine if font data of a second particular point size is to be selected instead of the font data of the first particular point size based on the size of the region of the character image in the enlarged or reduced image data: and
outputting the selected font data.

9. The method of claim 8, wherein the size recognizer recognizes point size of characters by recognizing a font point size of the characters in a line in the character image, calculating the width of the line of the characters based on the width of the recognized font point size, measuring the actual width of the line of characters, comparing the calculated width to the actual width, and correcting the recognized point font size according to the ratio of the calculated width to the actual width.

10. A computer-readable medium containing an image processing program for having a computer execute a process comprising:
recognizing character codes from characters in a character region in a character image included in image data to be processed;
recognizing a point size of the characters in the character code in the character region image;
setting a magnification;
selecting font data of a particular point size from among a plurality of font data of different point sizes based on the recognized character codes, the recognized font point sizes, the set magnification, and a size of a region of the character image in the magnified or un-magnified image data;
wherein font data of a first particular point size is first selected based on the recognized character codes, the font point size recognized by said size recognizer. and the magnification set by said setter, and a determination is then made to determine if font data of a second particular point size is to be selected instead of the font data of the first particular point size based on the size of the region of the character image in the enlarged or reduced image data; and
outputting the selected font data.

11. The recordable medium of claim 10, wherein the recognizing of point size of the characters in the character image is done by recognizing a font point size of the characters in a line in the character image, calculating the width of the line of characters based on the width of recognized font point size, measuring the actual width of the line of characters, comparing the calculated width to the actual width, and correcting the recognized point size according to the ratio of the calculated width to the actual width.

12. An image processor comprising:
an instruction section which instructs to output image data of N pages to be processed in M sheets of recording medium, wherein N and M are natural numbers and N is not equal to M;
a region recognizer which recognizes character regions and non-character regions of the image data of the N pages, wherein the character regions and non-character regions exist in the image data in a predetermined existing order;
a code recognizer which recognizes character codes from a character image of each character region;
a memory section which stores font data;
a selector which selects font data based on the character code recognized by said code recognizer;
a synthesizer which generates output image data by reconstructing a layout of the non-character image regions and the character regions represented by the font data selected by said selector in the M sheets with keeping the predetermined existing order, and in the reconstructed layout, at least one of a shape of each character region and a start point of a new line of each character region may be changed; and an output section which outputs the output image data generated by said synthesizer.

13. The image processor according to claim 12, wherein said memory section stores the plurality of font data of different sizes, further comprising a font size calculator which calculates a size of the font data to be selected by said selector so that the font data selected by said selector are included in a predetermined area in the M sheets.

14. The image processor according to claim 12, further comprising:
    a discriminator which discriminates a character region in the image data to be processed;
    a region size calculator which calculates a size of an output character region in the M sheets according to the character region discriminated by said discriminator; and
    a font size calculator which calculates a size of the font data to be selected by said selector so that the font data selected by said selector are included in the output character region in the M sheets.

15. The image processor according to claim 12, wherein N is larger than M.

16. The image processor according to claim 15, wherein N is an odd number.

17. The image processor of claim 12, wherein the recognizing of point size of the characters in the character image is done by recognizing a font point size of the characters in a line in the character image, calculating the width of the line of characters based on the width of recognized font point size, measuring the actual width of the line of characters, comparing the calculated width to the actual width, and correcting the recognized point size according to the ratio of the calculated width to the actual width.

18. An image processing method comprising:
    instructing to output image data of N pages to be processed in M sheets of recording medium, wherein N and M are natural numbers and N is not equal to M;
    recognizing character regions and non-character regions of the image data of the N pages, wherein the character regions and non-character regions exist in the image data in a predetermined existing order;
    recognizing character code from a character image of each character region;
    selecting font data based on the recognized character codes;
    generating output image data in a layout of M sheets by reconstructing a layout of the non-character image regions and the character regions represented by the font data by using the selected font data, and in the reconstructed layout, at least one of a shape of each character region and a start point of a new line of each character region may be changed; and
    outputting the generated output image data.

19. The image processing method of claim 18, wherein the recognizing of point size of the characters in the character image is done by recognizing a font point size of the characters in a line in the character image, calculating the width of the line of characters based on the width of recognized font point size, measuring the actual width of the line of characters, comparing the calculated width to the actual width, and correcting the recognized point size according to the ratio of the calculated width to the actual width.

20. A computer-readable medium containing an image processing program for having a computer execute a process comprising:
    instructing to output image data of N pages to be processed in M sheets of recording medium, wherein N is not equal to M;
    recognizing character regions and non-character regions of the image data of N pages, wherein the character regions and non-character regions exist in the image data in a predetermined existing order;
    recognizing character codes in a character image of each character region;
    selecting font data based on the recognized character codes;
    generating output image data by reconstructing a lay-out of non-character image regions and the character regions represented by laying out the selected font data in the M sheets, with keeping the predetermined existing order, and in the reconstructed layout, at least one of a shape of each character region and a start point of a new line of each character region may be changed; and
    outputting the generated output image data.

21. The recordable medium of claim 20, wherein the recognizing of point size of the characters in the character image is done by recognizing a font point size of the characters in a line in the character image, calculating the width of the line of characters based on the width of recognized font point size, measuring the actual width of the line of characters, comparing the calculated width to the actual width, and correcting the recognized point size according to the ratio of the calculated width to the actual width.

* * * * *